US012638798B2

(12) United States Patent
Eguchi

(10) Patent No.: US 12,638,798 B2
(45) Date of Patent: May 26, 2026

(54) IMAGE FORMING APPARATUS CONTROLLING CHARGING VOLTAGES

(71) Applicant: CANON KABUSHIKI KAISHA, Tokyo (JP)

(72) Inventor: Hiroki Eguchi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/958,975

(22) Filed: Nov. 25, 2024

(65) Prior Publication Data

US 2025/0172896 A1 May 29, 2025

(30) Foreign Application Priority Data

Nov. 26, 2023 (JP) ................................ 2023-199524

(51) Int. Cl.
*G03G 15/00* (2006.01)
*G03G 15/02* (2006.01)
(Continued)

(52) U.S. Cl.
CPC ..... *G03G 15/5004* (2013.01); *G03G 15/0216* (2013.01); *G03G 15/0266* (2013.01);
(Continued)

(58) Field of Classification Search
CPC ........... G03G 15/5004; G03G 15/0216; G03G 15/0266; G03G 15/1675; G03G 15/1685;
(Continued)

(56) References Cited

U.S. PATENT DOCUMENTS 6,847,796 B2 * 1/2005 Chigono ............ G03G 15/0216 399/176
8,180,256 B2 5/2012 Komatsu
(Continued)

FOREIGN PATENT DOCUMENTS

EP 2 515 179 A2 10/2012
JP 2005-017383 A 1/2005
(Continued)

OTHER PUBLICATIONS

Extended European Search Report dated Mar. 31, 2025, in European Patent Application No. 24211067.4.

*Primary Examiner* — Joseph S Wong
(74) *Attorney, Agent, or Firm* — Venable LLP

(57) ABSTRACT

An image forming apparatus includes a photosensitive member, first and second charging members, a developing member, a transfer member, first and second charging voltage applying portions, a transfer voltage applying portion, and a controller. The controller controls the transfer voltage applying portion so that a region of at least a part of the photosensitive member surface contacting the transfer member in a transfer position has a potential of an opposite polarity to the predetermined polarity, controls the first charging voltage applying portion so that the surface of the photosensitive member is charged in a first charging position by applying a first charging voltage of less than a discharge start voltage, and controls the second charging voltage applying portion so that the surface of the photosensitive member is charged in a second charging position by applying a second charging voltage of not less than the discharge start voltage.

12 Claims, 9 Drawing Sheets

(51) Int. Cl.
*G03G 15/16* (2006.01)
*G03G 21/00* (2006.01)

(52) U.S. Cl.
CPC ..... *G03G 15/1675* (2013.01); *G03G 15/1685* (2013.01); *G03G 21/0064* (2013.01); *G03G 2215/00957* (2013.01); *G03G 2215/00962* (2013.01)

(58) Field of Classification Search
CPC ..... G03G 21/0064; G03G 2215/00957; G03G 2215/00962
See application file for complete search history.

(56) References Cited

U.S. PATENT DOCUMENTS

| | | | |
|---|---|---|---|
| 8,787,783 | B2 | 7/2014 | Fuse |
| 9,915,889 | B2 | 3/2018 | Soda |
| 12,099,313 | B2 | 9/2024 | Eguchi et al. |
| 12,164,241 | B2 | 12/2024 | Hirose et al. |
| 2024/0103409 | A1 | 3/2024 | Eguchi et al. |

FOREIGN PATENT DOCUMENTS

| | | | |
|---|---|---|---|
| JP | 2012-230139 | A | 11/2012 |
| JP | 2016-218155 | A | 12/2016 |
| JP | 2023-056470 | A | 4/2023 |

* cited by examiner

IMAGE FORMING APPARATUS CONTROLLING CHARGING VOLTAGES

FIELD OF THE INVENTION AND RELATED ART

The present invention relates to an image forming apparatus, such as a printer, a copying machine, or a facsimile machine, of an electrophotographic type.

Conventionally, in the image forming apparatus, such as a laser printer, of the electrophotographic type, a surface of a photosensitive member is electrically charged by a charging means, and the charged surface of the photosensitive member is exposed to light by an exposure means (image developing position), so that an electrostatic latent image is formed on the photosensitive member. Then, toner is deposited on the electrostatic latent image by a developing means, so that a toner image is formed on the photosensitive member, and this toner image is transferred onto a sheet-like recording material by a transfer means.

As the photosensitive member, a rotatable photosensitive drum is used in many cases. Further, as the transfer means, a transfer member such as a transfer roller for forming a transfer portion in contact with the photosensitive member is used in many cases. In the following, an image forming apparatus including the photosensitive drum and the transfer roller will be described as an example. A toner image on the photosensitive drum is transferred from the photosensitive drum onto the recording material under application of a transfer voltage of a polarity opposite to a charge polarity of the photosensitive drum to the transfer roller.

Here, the charge polarity (normal charge polarity) of the photosensitive drum is a polarity of a potential formed on a surface of the photosensitive drum charged by the charging means for image formation. At this time, particularly, when an absolute value of the transfer voltage is large, electric discharge generates between the photosensitive drum and the transfer roller, so that the surface of the photosensitive drum is non-uniformly charged in some instances. This phenomenon is referred to as a “transfer memory”. In the case where the transfer memory occurs and the surface of the photosensitive drum is non-uniformly charged, when the surface of the photosensitive drum is subsequently charged by the charging means, it is difficult to uniformize a surface potential of the photosensitive drum in some instances.

For example, as a condition in which the transfer memory is liable to occur, in the case of an image forming apparatus of a direct transfer type in which the toner image is directly transferred from the photosensitive member onto the recording material, it is possible to cite a state in which the transfer voltage is not applied to the transfer roller in a state that the recording material is not interposed between the photosensitive drum and the transfer roller. In the state that the recording material which is an electric resistor is not interposed between the photosensitive drum and the transfer roller, when a transfer voltage similar to a transfer voltage when the recording material is interposed between the photosensitive drum and the transfer roller is applied to the transfer roller, the electric discharge is liable to occur between the photosensitive drum and the transfer roller in some cases.

As a technique for alleviating the transfer memory, a method of discharging the surface of the photosensitive drum by irradiating the surface of the photosensitive drum, after passing through a transfer portion, to light has been known. Japanese Laid-Open Patent Application No. 2016-218155 discloses an image forming apparatus in which a pre-exposure means (pre-charging exposure means) for exposing the surface of the photosensitive drum, immediately after passing through the transfer portion, to light is provided.

In the transfer memory occurring in the case where the absolute value of the transfer voltage in the state in which the recording material is not interposed between the photosensitive drum and the transfer roller is large, potential non-uniformity due to electric discharge non-uniformity depending on a surface shape of the transfer roller generates on the surface of the photosensitive drum. For example, in the case where a foam rubber is used as a surface layer of the transfer roller, the surface shape of the transfer roller is constituted by presence/absence of foam cells. That is, the potential non-uniformity generating on the surface of the transfer roller has a distribution to the same degree as a size of the foam cells. Due to this potential non-uniformity, the surface potential of the photosensitive drum on which the transfer memory generated causes fluctuations.

In the case where the surface potential of the photosensitive drum on which the transfer memory generated is, for example, the same in polarity as the charge polarity of the photosensitive drum and becomes lower in absolute value than a potential after the image exposure, even when the surface of the photosensitive drum is exposed to light by the above-described pre-exposure means, it is difficult to uniformize a potential of a portion where an absolute value of a surface potential has already become lower than the potential after the image exposure. Further, it would be also considered that exposure intensity of the pre-exposure means is made stronger than exposure intensity of the exposure means for performing the image exposure. However, particularly, in the case where at least part of the surface potential of the photosensitive drum on which the transfer memory generated is reversed in polarity to the opposite polarity to the charge polarity (charge potential), it is difficult to sufficiently uniformize the transfer memory.

SUMMARY OF THE INVENTION

A principal object of the present invention is to provide an image forming apparatus capable of suppressing occurrence of an image defect due to a transfer memory.

This object is achieved by an image forming apparatus according to the present invention.

According to an aspect of the present invention, an image forming apparatus includes a rotatable photosensitive member; a first charging member configured to electrically charge a surface of the photosensitive member in contact with the surface of the photosensitive member in a first charging position with respect to a rotational direction of the photosensitive member; a second charging member configured to electrically charge the surface of the photosensitive member in a second charging position with respect to the rotational direction of the photosensitive member; a developing member configured to form a toner image on the surface of the photosensitive member by supplying toner, charged to a predetermined polarity, to the surface of the photosensitive member in a developing position with respect to the rotational direction of the photosensitive member; a transfer member contacting the surface of the photosensitive member in a transfer position with respect to the rotational direction of the photosensitive member and configured to transfer the toner image from the photosensitive member onto a recording material passing through between the photosensitive member and the transfer member; a first charging voltage applying portion configured to apply a first charging voltage of the predetermined polarity to the first charging member; a second charging voltage applying portion configured to apply a second charging voltage of the predetermined polarity to the second charging member; a transfer voltage applying portion configured to apply a transfer voltage, of an opposite polarity to the predetermined polarity, to the transfer member; and a controller configured to control the first charging voltage applying portion, the second charging voltage applying portion, and the transfer voltage applying portion, wherein with respect to the rotational direction of the photosensitive member, the first charging position is positioned downstream of the transfer position and upstream of the second charging position, the second charging position is positioned downstream of the first charging position and upstream of the developing position, the developing position is positioned downstream of the second charging position and upstream of the transfer position, and the transfer position is positioned downstream of the developing position and upstream of the first charging position, and wherein the controller controls the transfer voltage applying portion so that on the surface of the photosensitive member directly contacting the transfer member in the transfer position, a region corresponding to between the recording material and a subsequent recording material, which is a recording material subsequent to the recording material, has a potential of the opposite polarity to the predetermined polarity, the first charging voltage applying portion so that the surface of the photosensitive member is charged in the first charging position by applying the first charging voltage of less than a discharge start voltage to the first charging member in the first charging position, and the second charging voltage applying portion so that the surface of the photosensitive member is charged in the second charging position by applying the second charging voltage of not less than the discharge start voltage to the second charging member in the second charging position.

Further features of the present invention will become apparent from the following description of exemplary embodiments with reference to the attached drawings.

Figure 3:
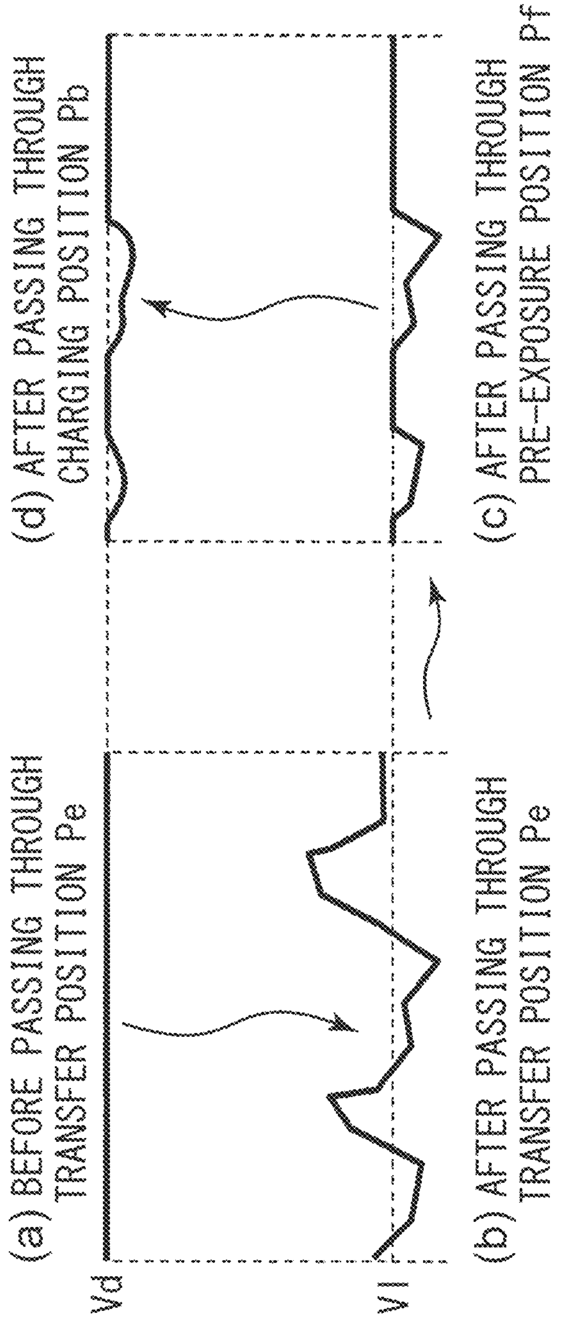

Parts (a) to (d) of FIG. 3 are schematic views for illustrating progression of a surface potential of a photosensitive drum in the conventional example 1.

Figure 4:
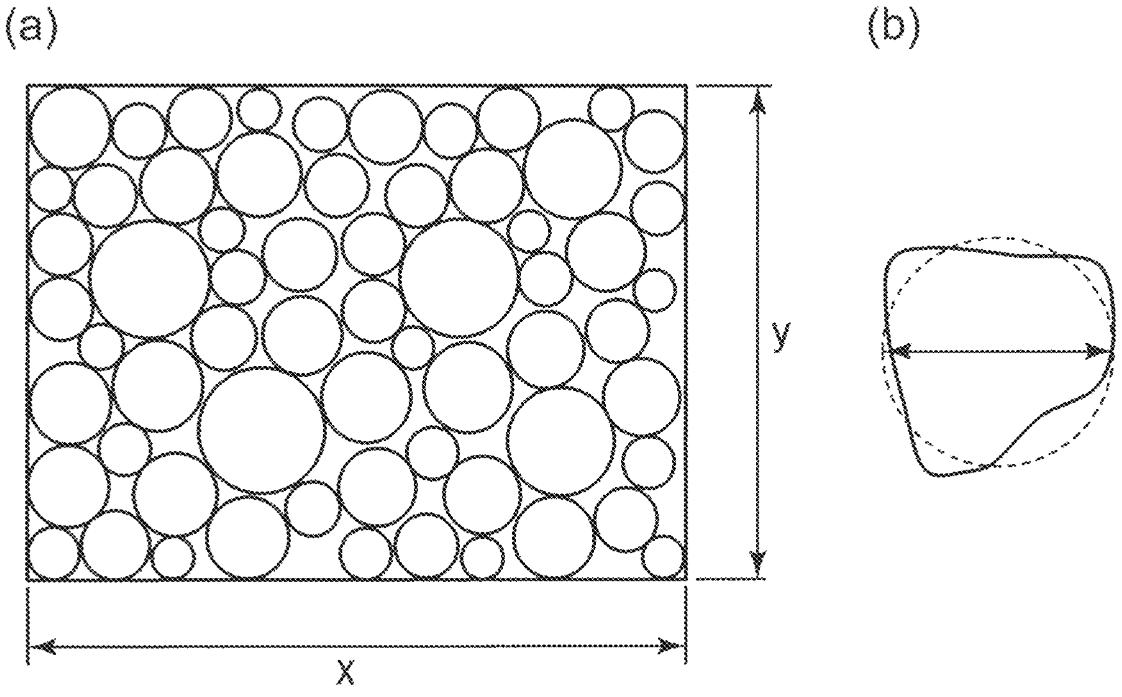

Parts (a) and (b) of FIG. 4 are schematic views for illustrating a method for measuring a cell diameter of a foam material.

Figure 5:
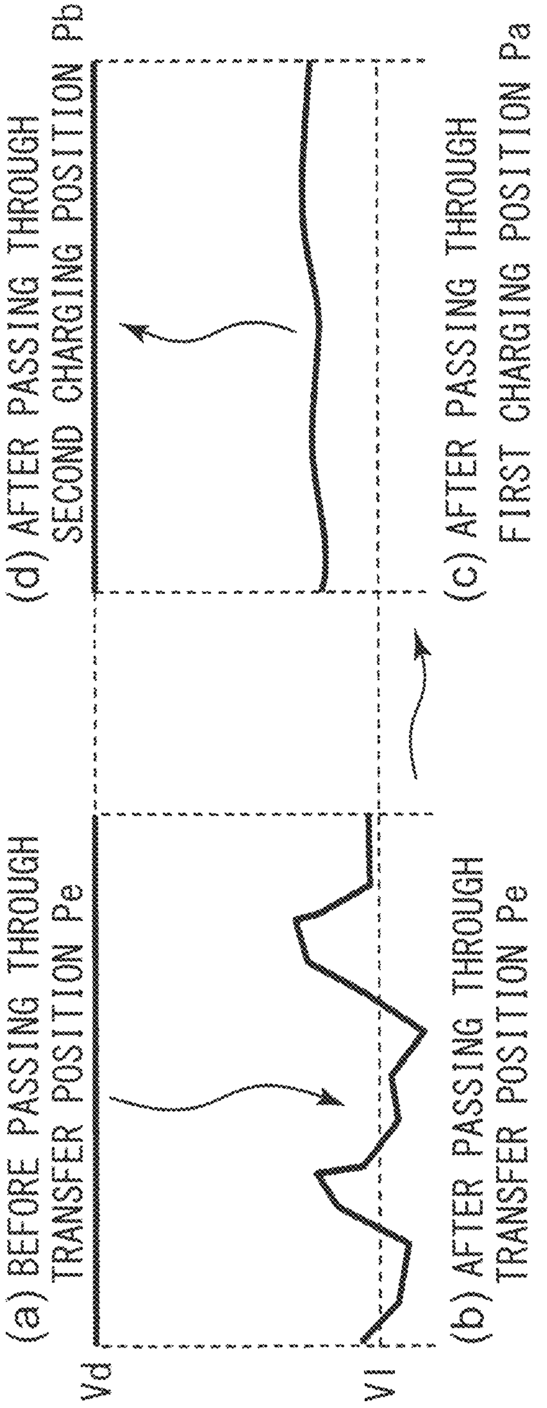

Parts (a) to (d) of FIG. 5 are schematic views for illustrating progression of surface potential of a photosensitive drum in the embodiment 1.

Figure 6:
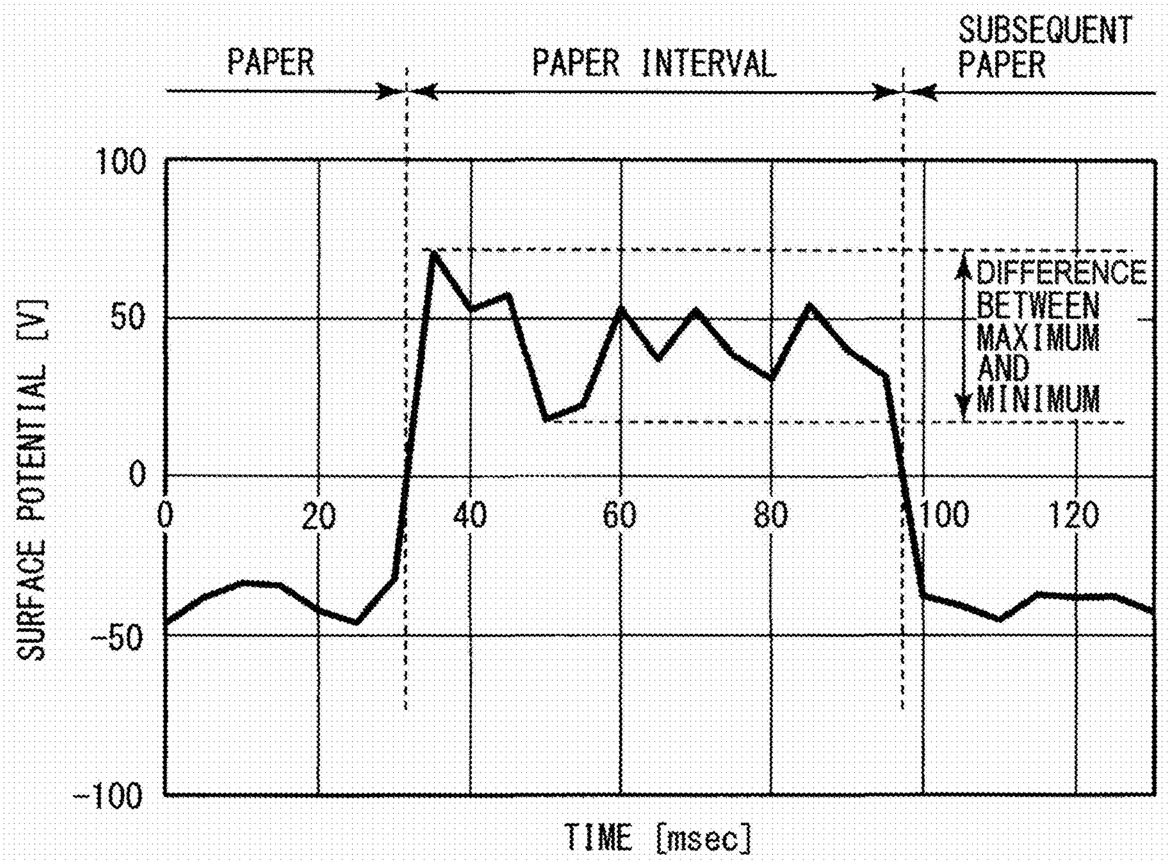

FIG. 6 is a graph showing an example of the surface potential of the photosensitive drum after passing through a transfer position.

Figure 7:
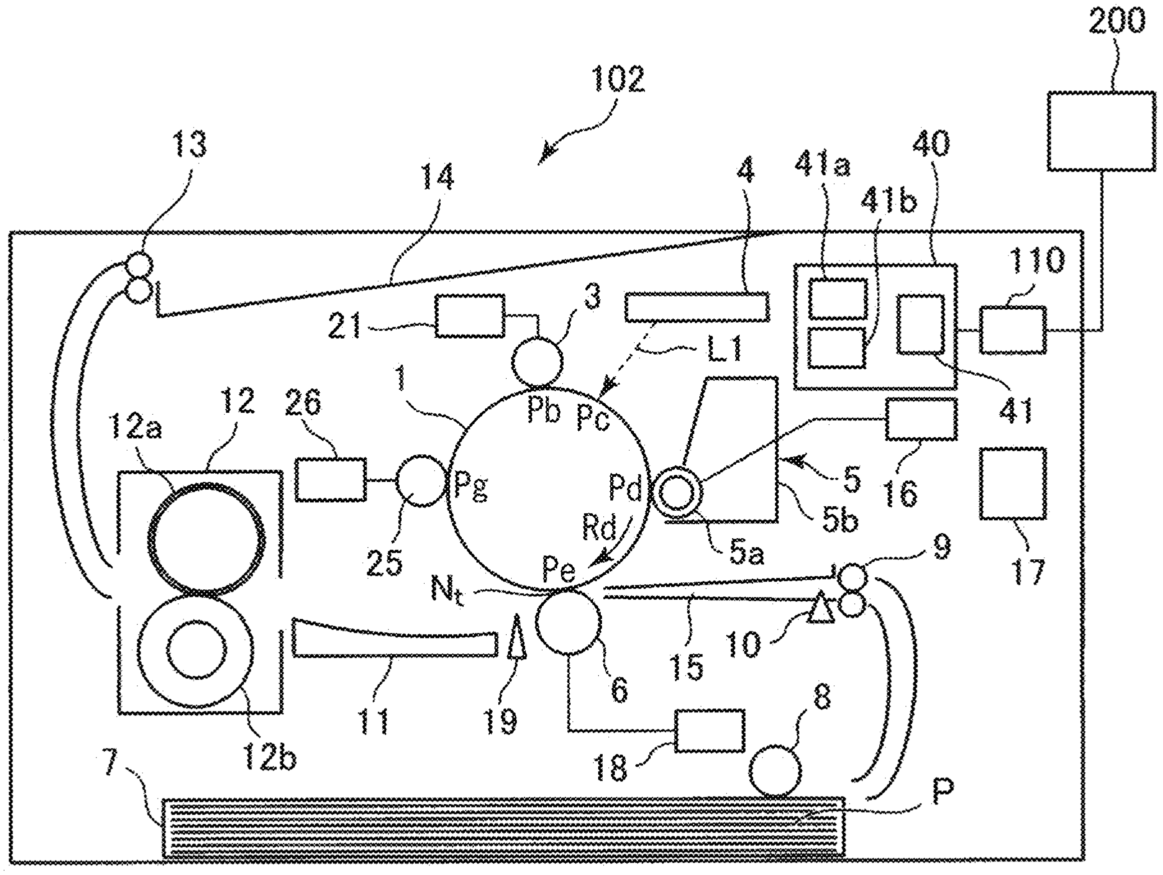

FIG. 7 is a schematic sectional view of an image forming apparatus of a modified embodiment of the embodiment 1.

Figure 8:
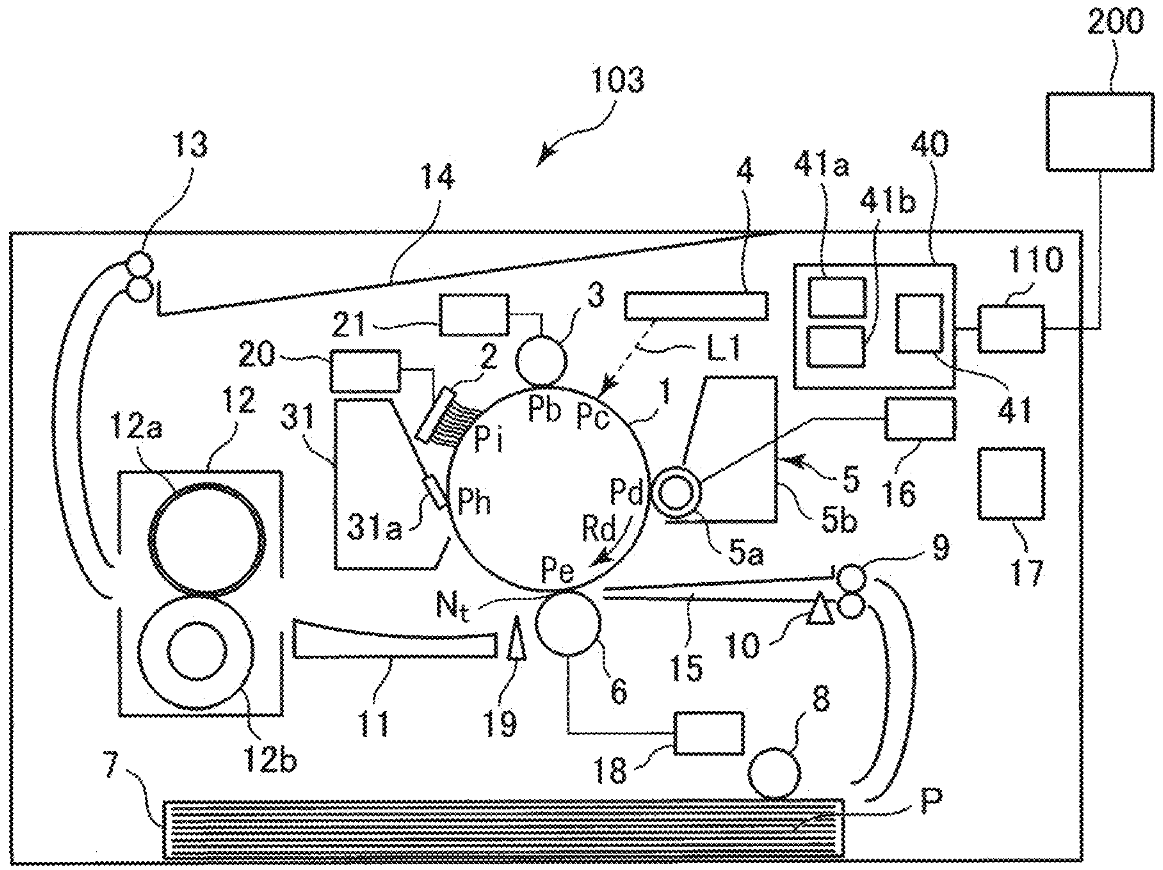

FIG. 8 is a schematic sectional view of an image forming apparatus of an embodiment 2.

Figure 9:
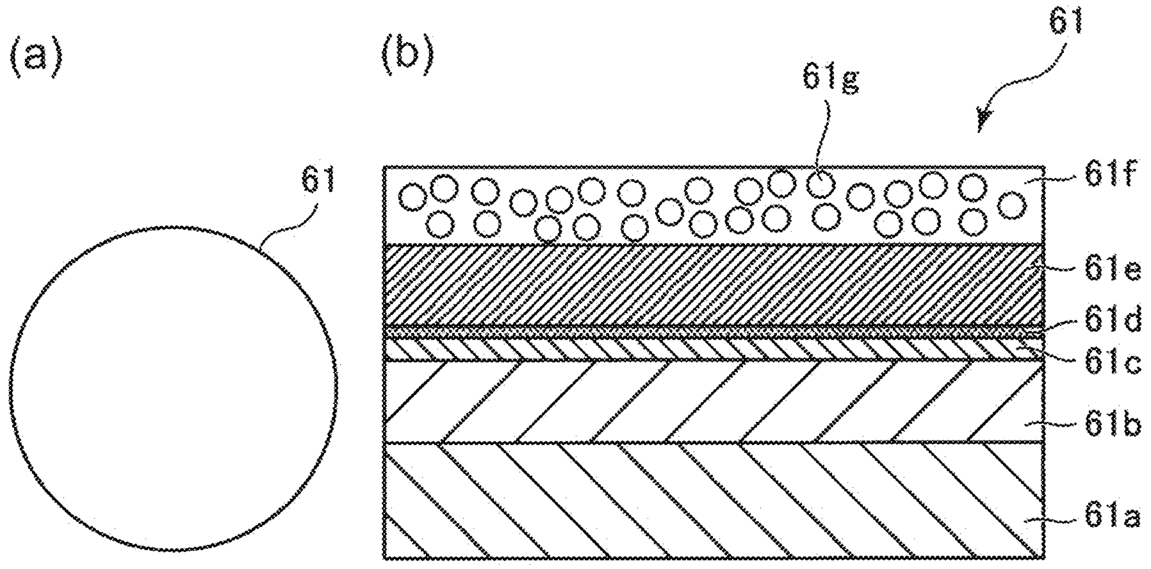

Parts (a) and (b) of FIG. 9 are schematic views for illustrating a layer structure of a photosensitive drum in an embodiment 3.

DESCRIPTION OF THE EMBODIMENTS

In the following, an image forming apparatus according to the present invention will be described specifically with reference to the drawings.

(1) Image Forming Apparatus (1-1) Constitution of Image Forming Apparatus

Figure 1:
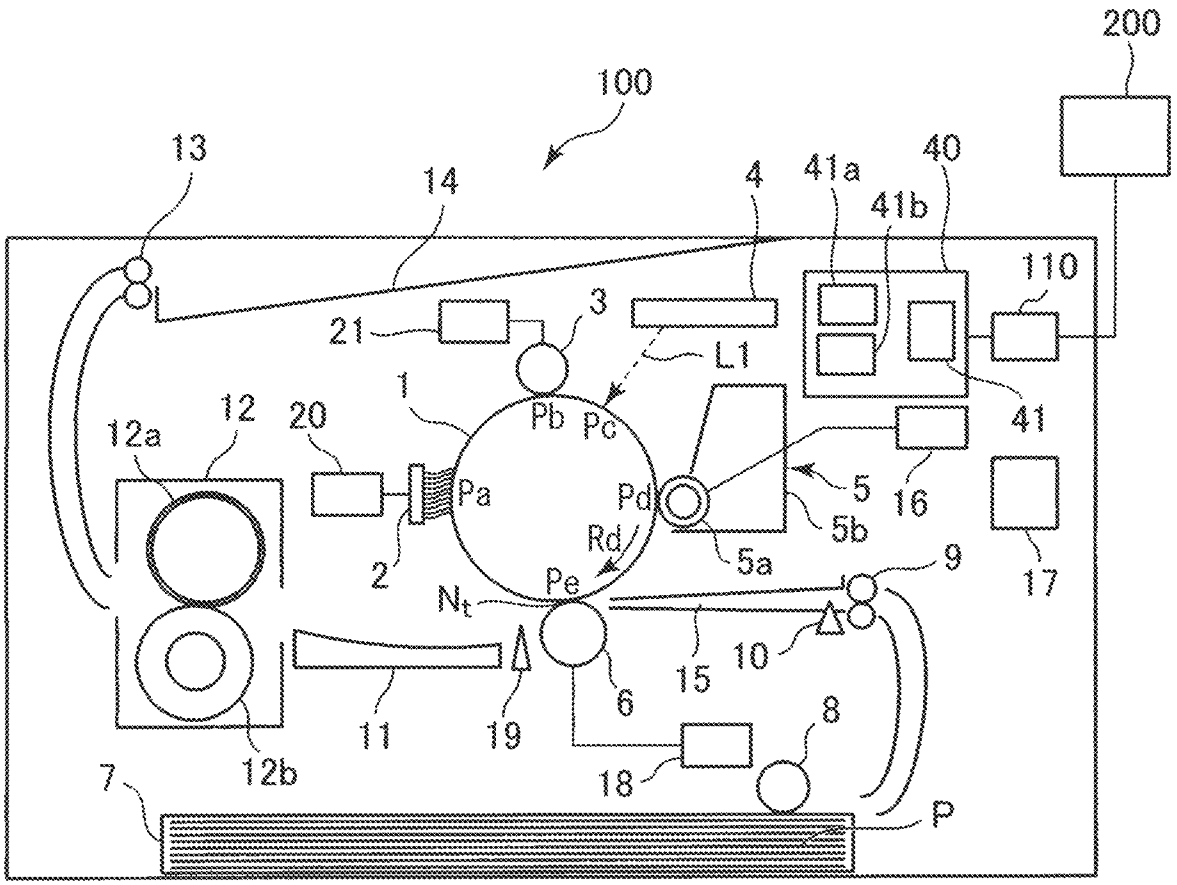
FIG. 1 is a schematic sectional view of an image forming apparatus of an embodiment 1.

FIG. 1 is a schematic sectional view of an image forming apparatus 100 of an embodiment 1. The image forming apparatus 100 of this embodiment is a laser beam printer of an electrophotographic type and is capable of forming a black (monochromatic) image on a recording material P depending on image information inputted from an external device 200 such as a personal computer. First, a constitution of the image forming apparatus 100 of this embodiment will be described.

The image forming apparatus 100 includes a photosensitive drum 1 which is drum-shaped (cylindrical) photosensitive member as an image bearing member inside an apparatus main assembly. The photosensitive drum 1 is constituted by providing a photosensitive material, such as OPC (organic photoconductor), amorphous selenium, or amorphous silicon on a cylindrical drum substrate formed of aluminum, nickel, or the like. In this embodiment, the photosensitive drum 1 is a negatively chargeable OPC photosensitive member of φ24 mm in outer diameter. That is, in this embodiment, a charge polarity (normal charge polarity) of the photosensitive drum 1 is the negative polarity. This photosensitive drum 1 is constituted by laminating on a surface of an electroconductive supporting member constituted by an aluminum cylinder, an electroconductive layer, an undercoat layer, and a photosensitive layer consisting of two layers of a charge-generating layer and a charge-transporting layer in a named order from the electroconductive supporting member side. The photosensitive drum 1 is rotationally driven in an arrow Rd direction (clockwise direction) in FIG. 1.

Around the photosensitive drum 1, along a rotational direction Rd thereof, the following means are provided in a named order. First, a charging brush 2 which is a brush-shaped charging member as a first charging means is provided. In this embodiment, the charging brush 2 is constituted by sticking and fixing a fabric of 5 mm in width, obtained by forming electroconductive nylon fibers in a pile fabric, to an electroconductive supporting portion constituted by a stainless steel (metal) plate which also functions as an electric energy supplying electrode. In this embodiment, the electroconductive nylon fibers (brush fibers) constituting the charging brush 2 are 2 denier in fineness, 200 kF/inch$^2$ in bristle (yarn) planting density, and 4 mm in pile length. In this embodiment, the charging brush 2 contacts a surface (outer peripheral surface) of the photosensitive drum 1 so that an entering amount of bristle tips of the brush fibers into the photosensitive drum 1 becomes 0.6 mm. Further, in this embodiment, the charging brush 2 is fixedly disposed and rubs the surface of the photosensitive drum 1 with rotation of the photosensitive drum 1. Incidentally, a width of the charging brush 2 is a length of the charging brush 2 in a direction along a surface movement direction of the photosensitive drum 1. Further, "kF/inch$^2$" which is a unit of the bristle planting density shows the number of filaments per (one) square inch. The charging brush 2 substantially uniformly contacts the surface of the photosensitive drum 1 at tips of the brush fibers thereof, and is disposed so that a change in bristle tip of the brush fibers is reduced by rotation of the photosensitive drum 1. Here, the above-described entering amount is represented by a difference between a length (pile length) of the brush fibers and a clearance between a brush fiber supporting portion and the photosensitive drum 1 in a state in which a force for bending the brush fibers is not externally exerted. In this embodiment, the brush fibers of the charging brush 2 are higher in electric resistance on an outer peripheral surface side than a central side in a cross-sectional direction of the brush fibers. For that reason, in this embodiment, in order to satisfactorily perform injection charging (described later), the charging brush 2 is disposed so that the tips of the brush fibers contact the surface of the photosensitive drum 1. Incidentally, this does not apply, for example, in the case where brush fibers sufficiently low in electric resistance on the outer peripheral surface side in the cross-sectional direction, and preferably, the charging brush 2 is caused to enter the photosensitive drum 1 so that a first charging ratio (brush charging ratio) (described later) becomes a predetermined value or more, and thus the brush fibers may be laid down. A position where a charging process by the charging brush 2 on the photosensitive drum 1 in a rotational direction of the photosensitive drum 1 is performed is a first charging position Pa. The charging brush 2 electrically charges the surface of the photosensitive drum 1 principally by direct injection charging. The charging brush 2 charges the surface of the photosensitive drum 1 by flowing of a current, depending on a potential difference between the charging brush 2 and the photosensitive drum 1, through a portion where the brush fibers directly contact the surface of the photosensitive drum 1. The charging brush 2 is disposed along a rotational axis direction of the photosensitive drum 1, and a length of a region, in which the brush fibers are provided, in the rotational axis direction is longer than a length of an image forming region (a toner image formable region) on the photosensitive drum 1 in the rotational axis direction.

Next, a charging roller 3 which is a roller-shaped charging member as a second charging means is provided. In this embodiment, the charging roller 3 is constituted by an electroconductive base shaft (core metal, core portion) also functioning as an electric energy supplying electrode, and an elastic layer cylindrically surrounding an outer peripheral surface of the core metal. In this embodiment, the charging roller 3 is an elastic roller of φ10 mm in roller outer diameter, φ5 mm in core metal diameter, and 2.5 mm in thickness of the elastic layer. In this embodiment, SUS (stainless steel) is used as a material of the core metal of the charging roller 3, and a mixture rubber material of NBR (nitrile rubber) and epichlorohydrin is used as a material of the elastic layer of the charging roller 3. The charging roller 3 is press-contacted to the photosensitive drum 1 and is rotated with rotation of the photosensitive drum 1.

With respect to the rotational direction of the photosensitive drum 1, a position on the photosensitive drum 1 where the photosensitive drum surface is charged by the charging roller 3 is a second charging position Pb. The charging roller 3 principally charges the surface of the photosensitive drum 1 by electric discharge generating in at least one of minute gaps, between the photosensitive drum 1 and the charging roller 3, formed on sides upstream and downstream of a contact portion between the photosensitive drum 1 and the charging roller 3 with respect to the rotational direction of the photosensitive drum 1. For simplicity, it may be considered that the contact portion between the photosensitive drum 1 and the charging roller 3 is regarded as the second charging position Pb. A rotational axis direction of the charging roller 3 is substantially parallel to the rotational axis direction of the photosensitive drum 1, and a length of the elastic layer of the charging roller 3 contacting the surface of the photosensitive drum 1 in the rotational axis direction of the photosensitive drum 1 is longer than the length of the image forming region on the photosensitive drum 1 in the same direction.

Next, an exposure device 4 as an exposure means is provided. In this embodiment, the exposure device 4 is constituted by a laser scanner device (laser optical system). With respect to the rotational direction of the photosensitive drum 1, a position where the surface of the photosensitive drum 1 is exposed to light by the exposure device 4 is an exposure position Pc.

Next, a developing device 5 as a developing means is provided. In this embodiment, in the developing device 5, a non-magnetic one-component developer (toner) is used as a developer. This developing device 5 includes a developing roller 5*a* as a developer carrying member (developing member), and a developing container 5*b* which is a container for accommodating the developer. The developing roller 5*a* is contacted to the surface of the photosensitive drum 1 and supplies the toner to a developing portion which is an opposing portion (contact portion) to the photosensitive drum 1. To the developing roller 5*a*, the toner in the developing container 5*b* is supplied. Incidentally, as the developer, the developing device 5 may use a magnetic one-component developer (toner) or a two-component developer containing toner and a carrier. With respect to the rotational direction of the photosensitive drum 1, a position on the photosensitive drum 1 where the toner is supplied by the developing roller 5*a* (a position of contact of the developing roller 5*a* with the photosensitive drum 1 in this embodiment) is a developing position Pd. In this embodiment, the normal charge polarity of the toner, which is a principal charge polarity during development, is the negative polarity.

Next, a transfer roller 6 which is a roller-shaped transfer member (rotatable transfer member) as a transfer means is provided. The transfer roller 6 is urged (pressed) toward the photosensitive drum 1 by a transfer pressing spring (not shown) which is an urging member as an urging means, and is press-contacted to the photosensitive drum 1. By this, a transfer nip (transfer portion, transfer nip portion) Nt which is a contact portion between the photosensitive drum 1 and the transfer roller 6 is formed. The transfer roller 6 is rotated with rotation of the photosensitive drum 1. The transfer roller 6 not only nips and feeds the recording material P between itself and the photosensitive drum 1, but also transfers the toner image from the photosensitive drum 1 onto the recording material P under application of a voltage. In this embodiment, the transfer roller 6 is constituted by an electroconductive base shaft (core metal, core portion) also functioning as an electric energy supplying energization electrode, and an elastic layer cylindrically surrounding an outer peripheral surface thereof. As a material of this elastic layer, in general, a semiconductor rubber material constituted by using EPDM (ethylene propylene diene methylene rubber), NBR (nitrile-butadiene rubber), SBR (styrene-butadiene rubber), urethane rubber, epichlorohydrin rubber, silicone rubber, or the like is used. The material of the elastic layer may contain an electroconductive agent, such as an ion-conductive agent, in an appropriate amount. Further, in order to uniformly bring the outer peripheral surface of the photosensitive drum 1 and an outer peripheral surface of the transfer roller 6 into contact with each other, in some instances, the elastic layer of the transfer roller 6 is formed of a foam member (elastic foam member) and a cell structure is formed in the neighborhood of the surface of the transfer roller 6. The transfer roller 6 used in this embodiment is a foamable elastic roller which is φ14 mm in roller outer diameter, φ5 mm in core metal diameter, and 4.5 mm in thickness of the elastic layer and in which the elastic layer is constituted by an elastic foam layer. In this embodiment, in the case where a cell diameter of the surface of the transfer roller 6 was measured by a measuring method (described later), the cell diameter was 300 μm. In this embodiment, SUS is used as a material of the core metal of the transfer roller 6, and a mixture rubber material of SBR and epichlorohydrin is used as a material of the elastic layer. With respect to the rotational direction of the photosensitive drum 1, a position where the toner image on the photosensitive drum 1 is transferred onto the recording material P (position corresponding to the above-described transfer nip Nt) is a transfer position Pe.

Next, a charge-removing needle 19 as a charge-removing member for not only removing excessive electric charges on the surface of the recording material P after the transfer but also reducing a degree of potential non-uniformity on the photosensitive drum 1 generated by peeling (electric) discharge is provided. As the charge-removing needle 19, it is possible to use a charge-removing needle which is provided with a saw-tooth-like sharp end portion and which is formed with a thin metal plate material, such as SUS plate or aluminum plate, having good electroconductivity. This charge-removing needle 19 is disposed on a side downstream of the transfer roller 6 with respect to a feeding (conveying) direction of the recording material P so that a needle tip opposes the surface of the photosensitive drum 1.

Further, at a lower portion of the image forming apparatus 100, a recording material cassette 7 in which the recording material (transfer material, recording medium, sheet) P such as paper is accommodated is provided. Further, along a feeding passage of the recording material P from the recording material cassette 7, a feeding roller 8, a conveying roller 9, a top sensor 10, a pre-transfer conveying guide 15, a transfer-fixing conveying guide 11, a fixing device 12, a discharging roller 13 and a discharge tray 14 are disposed in a named order. Further, the image forming apparatus 100 is provided with a controller 40 for carrying out control of an operation of the image forming apparatus 100.

Incidentally, the photosensitive drum 1, and as process means actable on the photosensitive drum 1, the charging brush 2, the charging roller 3, and the developing device 5 may be integrally assembled into a process cartridge detachably mountable to the apparatus main assembly of the image forming apparatus 100.

(1-2) Image Forming Operation

Next, an image forming operation in the image forming apparatus 100 of this embodiment will be described.

The photosensitive drum 1 is rotationally driven in an arrow Rd direction (clockwise direction) in FIG. 1 at a peripheral speed (process speed) of 300 mm/sec by a driving force transmitted from a driving source 17 constituting a driving means. The surface of the rotating photosensitive drum 1 is electrically charged by the charging brush 2 and the charging roller 3 substantially uniformly to a predetermined potential (dark-portion potential, charge potential, non-image portion potential) of the same polarity as the normal charge polarity (negative polarity in this embodiment) of the toner. During the charging, to the charging brush 2, a first charging voltage (first charging bias) which is a DC voltage of the negative polarity is applied from a first charging power source (high-voltage power source) 20 as a first charging voltage applying means (first charging voltage applying portion). Further, during the charging, to the charging roller 3, a second charging voltage (second charging bias) which is a DC voltage of the negative polarity is applied from a second charging power source (high-voltage power source) 21 as a second charging voltage applying means (second charging voltage applying portion). In this embodiment, as an example, a first charging voltage of −500 V is applied to the charging brush 2 and a second charging voltage of −1100 V is applied to the charging roller 3, so that a dark-portion potential Vd of −500 V is formed on the surface of the photosensitive drum 1.

The charged surface of the photosensitive drum 1 is subjected to scanning exposure depending on image information by the exposure device (laser scanner) 4, so that an electrostatic latent image (electrostatic image) is formed on the photosensitive drum 1. A video controller 110 of the image forming apparatus 100 generates a time-series electric digital pixel signal by processing the image information inputted from the external device 200 to the image forming apparatus 100. The exposure device 4 outputs laser light L1 modulated depending on the time-series electric digital pixel signal, and subjects the charged surface of the photosensitive drum 1 to scanning exposure (image exposure) to the laser light L. In this embodiment, electric charges on the photosensitive drum 1 at a portion exposed to the light by the exposure device 4 are removed, so that a light-portion potential (post-image exposure potential, image portion potential) Vl of −100 V is formed on the surface of the photosensitive drum 1. By this, the electrostatic latent image is formed on the photosensitive drum 1 by a contrast between the dark-portion potential Vd and the light-portion potential Vl.

The electrostatic latent image formed on the photosensitive drum 1 is developed (visualized) by being supplied with the toner by the developing device 5, so that the toner image (toner picture, developer image) is formed on the photosensitive drum 1. During the development, to the developing roller 5*a*, a developing voltage (developing bias) which is a DC voltage of the same polarity (negative polarity in this embodiment) as the normal charge polarity of the toner is applied by a developing power source (high-voltage power source) 16 as a developing voltage applying means (developing voltage applying portion), In this embodiment, as an example, the developing voltage of −350 V is applied to the developing roller 5*a*. In this embodiment, on an exposure portion (image portion) of the photosensitive drum 1 where an absolute value of the surface potential is lowered by the exposure after the photosensitive drum surface is charged substantially uniformly, toner charged to the same polarity (negative polarity in this embodiment) as the charge polarity of the photosensitive drum 1 is deposited (reverse development type).

The toner image formed on the photosensitive drum 1 is electrostatically transferred onto a predetermined position on the recording material P in the transfer nip Nt by the action of the transfer roller 6. During the transfer, to the transfer roller 6, a transfer voltage (transfer bias) which is a DC voltage of an opposite polarity (positive polarity in this embodiment) to the normal charge polarity of the toner is applied by a transfer power source (high-voltage power source) 18 as a transfer voltage applying means (transfer voltage applying portion).

The recording material P is accommodated in the recording material cassette 7 as a recording material accommodating portion and is fed one by one from the recording material cassette 7 by the feeding roller 8 as a feeding member. An interval between a trailing end of a present recording material (paper) P and a leading end of a subsequent recording material (subsequent paper) P which is a recording material P subsequent to the present recording material P in the case where images are continuously formed on the recording materials P is referred to as a sheet interval (paper interval). In this embodiment, a distance of the sheet interval is set to 20 mm. Incidentally, a time for this sheet interval is 67 msec which is very short, and therefore, when an absolute value of the transfer voltage is intended to be made low by a timing corresponding to the sheet interval, falling and raising of the transfer voltage are not in time in some instances. For such a reason, in this embodiment, between a period in which the recording material P passes through the transfer nip Nt (herein, this period is also referred to as "during sheet (paper) passing") and the sheet interval, the same transfer voltage is set. After the recording material P is fed by the feeding roller 8, the recording material P is conveyed by the conveying roller (registration roller) 9 as a conveying member, and is supplied to the transfer nip Nt along the pre-transfer conveying guide 15 as a guiding member. On the basis of a detection result of the leading end of the recording material P with respect to the feeding (conveying) direction by the top sensor 10 as the recording material detecting means, the conveying roller 9 supplies the recording material P to the transfer nip Nt so as to be timed to the toner image on the photosensitive drum 1.

From the recording material P on which the toner image is transferred in the transfer nip Nt, surface electric charges in an excessive charge amount are removed by the charge-removing needle 19. The recording material P passed through the charge-removing needle 19 is conveyed toward the fixing device 12 as a fixing means along the transfer-fixing conveying guide 11 as a guiding member. The fixing device 12 includes a fixing roller 12*a* and a pressing roller 12*b* press-contacting the fixing roller 12*a*. The fixing device 12 heats and presses the recording material P, on which an unfixed toner image is carried, passing through a nip between these rollers, so that the toner image is fixed on the recording material P.

The recording material P after the toner image is fixed by the fixing device 12 is discharged (outputted) on the discharge tray 14 as a discharging portion, formed at an upper surface of the image forming apparatus 100, by the discharging roller 13.

On the other hand, toner (transfer residual toner) remaining on the surface of the photosensitive drum 1 without being transferred during the transfer is removed and collected from the surface of the photosensitive drum 1 in the following step (cleaner-less type). In the transfer residual toner, toner charged to the positive polarity and toner which does not have a sufficient electric charge although the toner is charged to the negative polarity are present in mixture. The transfer residual toner is charged again to the negative polarity by injection charging or electric discharge in the first charging position Pa and the second charging position Pb. The transfer residual toner charged again to the negative polarity in the first charging position Pa and the second charging position Pb reaches the developing position Pd with the rotation of the photosensitive drum 1. Here, as described above, on the photosensitive drum 1 that has reached the developing position Pd, the electrostatic latent image depending on the image information is formed. Behavior of the transfer residual toner will be described by being divided into the behavior in an image portion (exposure portion) and the behavior in a non-image portion (non-exposure portion). The transfer residual toner deposited on the photosensitive drum 1 in the non-image portion is urged toward and transferred onto the developing roller 5*a* by a potential difference between the light-portion potential Vl of the photosensitive drum 1 and the developing voltage in the developing position Pd, and then is collected in the developing container 5*b*.

Incidentally, the toner collected in the developing container 5*b* is used again for the image formation. On the other hand, the transfer residual toner deposited on the photosensitive drum 1 in the image portion is urged toward the photosensitive drum 1 by a potential difference between the dark-portion potential Vd and the developing voltage in the developing position Pd, so that the transfer residual toner is not transferred from the photosensitive drum 1 onto the developing roller 5*a*. This transfer residual toner is moved together with the toner, transferred from the developing roller 5*a* onto the photosensitive drum 1, to the transfer position Pe, and is transferred onto the recording material P in the transfer nip Nt, so that the transfer residual toner is removed from the surface of the photosensitive drum 1.

By repeating the above-described operation, the image formation can be successively carried out. In this embodiment, the image forming apparatus 100 is capable of executing printing at a print speed of 56 sheets per min.

The controller 40 is constituted by including a CPU 41 as a calculation (computation) control means which is a central element for performing arithmetic processing, a ROM 41*a* and a RAM 41*b* as a storing means, an input/output portion (not shown) for controlling transfer of signals between the controller 40 and the respective portions, and the like. In the RAM 41*b* which is a rewritable memory, information inputted to the controller 40, detected information, a calculation (computation) result, and the like are stored, and in the ROM 41*a*, a control program, a data table acquired in advance, and the like are stored.

The CPU 41 and the memories such as the ROM 41*a* and the RAM 41*b* are capable of performing data transfer and reading to each other. The controller executes the image forming operation and the like by controlling operations of respective portions of the image forming apparatus 100 including the first charging power source 20, the second charging power source 21, the transfer power source 18, and the driving source 17.

The image forming apparatus 100 executes a job which is a series of operations for forming and outputting the image (images) on a single or a plurality of recording materials P and which is started by a single start instruction. The job includes in general an image forming step, a pre-rotation step, a sheet (paper) interval step, and a post-rotation step. The image forming step is a period in which formation of the electrostatic latent image for the image formed and outputted on the recording material P, formation of the toner image, and transfer of the toner image are carried out in actuality, and during image formation (image forming period) refers to this period. Specifically, a timing during image formation is different at each of the positions where the respective steps of the formation of the electrostatic latent image, the formation of the toner image, the transfer of the toner image are carried out. The pre-rotation step is period from the input of the start instruction until the image is started to be formed in actuality, in which a preparation operation before the image forming step is performed. The sheet interval step is a period corresponding to an interval between two recording materials P when the images are continuously formed on the plurality of recording materials P (continuous image formation). The post-rotation step is period in which a post operation (preparatory operation) after the image forming step is performed. During non-image formation (non-image forming period) is a period other than during the image formation and includes the pre-rotation step, the sheet interval step, the post-rotation step, and in addition, during turning-on of a power source of the image forming apparatus 100, or a pre-multi-rotation step which is a preparatory operation step during restoration from a sleep state, or the like.

(2) Image Defect Due to Transfer Memory

Next, a mechanism of generation of an image defect due to a transfer memory will be described.

Figure 2:
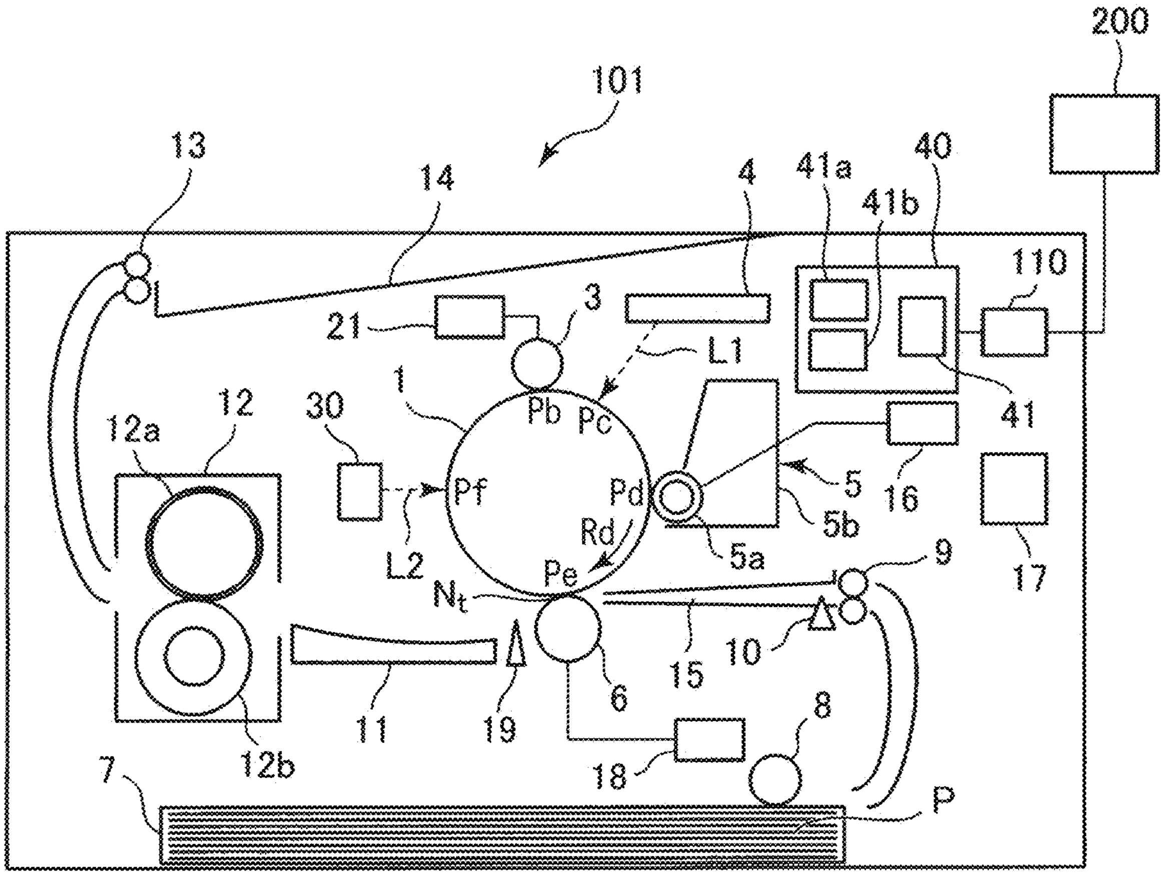
FIG. 2 is a schematic sectional view of an image forming apparatus of a conventional example 1.

FIG. 2 is a schematic sectional view of an image forming apparatus 101 of a conventional example 1. In the image forming apparatus 101 of the conventional example 1, the charging brush 2 in the image forming apparatus 100 of this embodiment (embodiment 1) is not provided, and instead thereof, a pre-exposure device 30 is provided. The pre-exposure device 30 is provided for uniformizing surface potential non-uniformity of the photosensitive drum 1 after passing through the transfer position Pe (and before reaching the charging position Pb), and exposes the surface of the photosensitive drum 1 by irradiating the surface of the photosensitive drum 1 with laser light L2 in a pre-exposure position Pf. In the conventional example 1, the laser light L2 of the pre-exposure device 30 has exposure intensity equal to the exposure intensity of the laser light L1 of the exposure device 4, so that the surface potential of the photosensitive drum 1 can be charge-removed to −100 V which is the same as the light-portion potential Vl. Except for the above-described point, a constitution and an operation of the image forming apparatus 101 of the conventional example 1 are substantially the same as those of the image forming apparatus 100 of this embodiment. In the image forming apparatus 101 of the conventional example 1, to elements having identical or corresponding functions or constitutions to those of the image forming apparatus 100 of this embodiment, the same reference numerals or symbols as those in this embodiment are added.

Parts (a) to (d) of FIG. 3 are schematic views for illustrating progression of the surface potential of the photosensitive drum 1 in a position corresponding to the sheet interval in the case where images are continuously formed on recording materials P by the image forming apparatus 101 of the conventional example 1. Part (a) of FIG. 3 shows the surface potential of the photosensitive drum 1 before passing through the transfer position Pe (after passing through the charging position Pb and before reaching the transfer position Pe), and in a position corresponding to the sheet interval, exposure by the exposure device 4 is not carried out, and therefore, the dark-portion potential Vd is maintained. Part (b) of FIG. 3 shows the surface potential of the photosensitive drum 1 after passing through the transfer position Pe (after passing through the transfer position Pe and before reaching the pre-exposure position Pf). In the conventional example 1, transfer voltage control which is the same as the transfer voltage control in this embodiment is employed, and therefore, in the sheet interval, a transfer voltage of the positive polarity and large in absolute value, which is the same as the transfer voltage during sheet passing is applied. For that reason, electric discharge due to a potential difference between the transfer roller 6 and the photosensitive drum 1 generates in the transfer nip Nt, so that potential non-uniformity (transfer memory) as shown in part (b) of FIG. 3 generates on the surface of the photosensitive drum 1. Unevenness of this transfer memory depends on a cell diameter of the surface of the transfer roller 6, and is generated due to a change in an electrical discharge state between a rubber portion and a foam portion (void portion). Further, when a potential difference between the transfer roller 6 and the photosensitive drum 1 is large, the electric discharge becomes more active. Further, as shown in part (b) of FIG. 3, a region having a surface potential having the same polarity as the charge polarity of the photosensitive drum 1 and lower in absolute value than the light-portion potential Vl (hereinafter, this surface potential is simply referred to as the "surface potential lower in absolute value than the light-portion potential VL" or the like) or a surface potential having an opposite polarity to the normal charge polarity of the photosensitive drum 1 (hereinafter, this surface potential is simply referred to as a "surface potential inverted in polarity" or the like) generates on the photosensitive drum 1. Part (c) of FIG. 3 shows a surface potential of the photosensitive drum 1 after passing through the pre-exposure position Pf (after passing through the pre-exposure position Pf and before reaching the charging position Pb). In the pre-exposure position Pf, the surface potential of the photosensitive drum 1 in a portion having a surface potential having the same polarity as the charge polarity of the photosensitive drum 1 and higher in absolute value than the light-portion potential Vl can be charge-removed. However, the surface potential of the photosensitive drum 1 in a portion having a surface potential lower in absolute value than the light-portion potential Vl or in a portion having the surface potential inverted in polarity cannot be uniformized. Part (d) of FIG. 3 shows a surface potential of the photosensitive drum 1 after passing through the charging position Pb (after passing through the charging position Pb and before reaching the transfer position Pe). Even when the photosensitive drum surface passes through the charging position Pb in the state of part (c) of FIG. 3, as shown in part (d) of FIG. 3, the surface potential in the portion where the absolute value thereof is lower in absolute value than the light-portion potential Vl due to the transfer memory and the surface potential in the portion where the polarity thereof is inverted due to the transfer memory cannot be sufficiently returned to the dark-portion potential Vd in some cases. In the portion where the surface potential cannot be sufficiently returned to the dark-portion potential Vd, a potential difference between the surface potential of the photosensitive drum 1 in the developing position Pd and the developing voltage cannot be ensured in a non-image portion of the image forming region for the subsequent recording material P. As a result, such a sufficient potential difference is visualized as an image defect such a black spot image or a fog image in some instances. Further, in the portion where the surface potential cannot be sufficiently returned to the dark-portion potential Vd, a potential difference between the surface potential of the photosensitive drum 1 in the developing position Pd and the developing voltage becomes large in an image portion of the image forming region for the subsequent recording material P, so that such a potential difference is visualized as an image defect such that a density of a half-tone image or the like becomes thick. Thus, in the image forming apparatus 101 of the conventional example 1, it is difficult to uniformize the transfer memory in the portion having the surface potential lower in absolute value than the light-portion potential Vl in the sheet interval and in the portion having the surface potential inverted in polarity, so that it is difficult to suppress the image defect due to the transfer memory.

Here, by increasing a light quantity of the pre-exposure device 30 to be higher than a light quantity in the conventional example 1, it is possible to lower the surface potential of the photosensitive drum 1 to 0 V. However, even in this case, it is difficult to recover the surface potential inverted in polarity to the dark-portion potential Vd after passing through the charging position Pb. Further, in the case where the light quantity of the pre-exposure device 30 is increased, a potential difference between the charging roller 3 and the photosensitive drum 1 becomes large, so that the electric discharge by the charging roller 3 becomes more active. When the electric discharge by the charging roller 3 becomes more active, damage on the photosensitive drum 1 is promoted, and therefore is not preferable. That is, even in the case where the light quantity of the pre-exposure device 30 is increased, it is difficult to suppress the image defect due to the transfer memory, and there is a possibility that the damage on the photosensitive drum 1 is promoted.

As described above, the unevenness of the potential of the surface of the photosensitive drum 1 due to the transfer memory depends on the cell diameter of the surface of the transfer roller 6. Parts (a) and (b) of FIG. 4 are schematic views for illustrating a method for measuring the cell diameter of the elastic foam layer (foam member, foam material).

In order to measure the cell diameter, the surface of the transfer roller 6 was observed by using a digital microscope ("VHX-1000", manufactured by KEYENCE Corp.) and a lens for the digital microscope ("VH-Z100R", manufactured by KEYENCE Corp.). Part (a) of FIG. 4 schematically shows an image obtained when the surface of the transfer roller 6 was observed with a magnification of 100 of the lens for the digital microscope. As shown in part (a) of FIG. 4, a plurality of cells are observed in the image obtained from the digital microscope. Incidentally, in this embodiment, diameters of 30 cells from a largest cell of all the cells in the image were measured, and an average (value) of the diameters was determined as the cell diameter of the surface of the transfer roller 6. Further, at this time, an angle of visibility (x×y) of the digital microscope is 4 mm×3 mm (range of a length of 4 mm and a width of 3 mm on the surface of the transfer roller 6). Here, a shape of the cells constituting the elastic layer of the transfer roller 6 is not limited to a shape close to a perfect circle. For example, as shown in part (b) of FIG. 4, the shape is a distorted shape in some instances. In this case, a diameter of a perfect circle having the same area as an area of the cell having the disordered shape is determined as an outer diameter of the cell.

(4) Suppressing Effect of Image Defect Due to Transfer Memory

Next, a suppressing effect of the image defect due to the transfer memory will be described.

Images were continuously formed on recording materials P by the image forming apparatus 100 of this embodiment, and occurrence or non-occurrence of the image defect due to the transfer memory was checked. To the charging brush 2, the first charging voltage of −500 V was applied. An image pattern for evaluating the occurrence or non-occurrence of the image defect due to the transfer memory was a half-tone image (image of 50% in toner application amount in the case where the toner application amount of a solid image is taken as 100%). Further, the presence or absence of a change in density of the half-tone image on a recording material P subsequent to a sheet interval with respect to the half tone image on a recording material P preceding the sheet interval was evaluated and, in the case where it was visually observed that the change in density of the half-tone image was present, the image pattern was discriminated as the occurrence ("x") of the image defect due to the transfer memory. Further, in the case where the change in density of the half-tone image was absent, the image pattern was discriminated as the non-occurrence ("○") of the image defect due to the transfer memory. Further, for comparison with this embodiment, a similar experiment was conducted for the image forming apparatus 101 of the above-described conventional example 1 and an image forming apparatus of a comparison example 1 in which the charging brush 2 was removed from the image forming apparatus 100 of this embodiment. A result is shown in a table 1 appearing hereinafter.

As shown in the table 1, in the image forming apparatus 100 of this embodiment in which the charging brush 2 is provided, even when the absolute value of the transfer voltage was increased, the image defect due to the transfer memory did not occur. In this embodiment, an appropriate set value of the transfer voltage is +3000 V (+3 kV). Further, in this embodiment, at the transfer voltage smaller than +3000 V, sufficient transfer from the photosensitive drum 1 onto the recording material P is not carried out, so that improper transfer occurs in some instances. Further, in this embodiment, even in the case where the transfer voltage of +3000 V was applied in the sheet interval, the image defect due to the transfer memory does not occur. For that reason, there is no need to change a set value of the transfer voltage between during sheet passing and in the sheet interval. That is, the image forming apparatus 100 of this embodiment achieves a faster process speed and a shorter sheet interval while suppressing the occurrence of the image defect due to the transfer memory.

Further, as shown in the table 1, in the image forming apparatus 101 of the conventional example 1 in which the pre-exposure device 30 is provided, at transfer voltages of +2000 V (+2 kV) or more, the image defect due to the transfer memory occurred. In the case where the transfer voltage was +2000 V, when the surface potential of the photosensitive drum 1, in a position corresponding to the sheet interval, after passing through the transfer position Pe was measured, the surface potential was −80 V which was lower in absolute value than the light-portion potential Vl (−100 V). That is, this shows that the image defect due to the transfer memory in the image forming apparatus 101 of the conventional example 1 occurred by the mechanism described using FIG. 3.

Further, as shown in the table 1, in the image forming apparatus of the comparison example 1, at transfer voltages of not less than +1500 V (+1.5 kV) which is lower than the transfer voltage (+2000 V) in the case of the conventional example 1, the image defect due to the transfer memory occurred. This is because in the image forming apparatus of the comparison example, there is no potential uniformizing effect by the pre-exposure device 30.

From the above-described result, it is understood that the image forming apparatus 100 of this embodiment is more advantageous in suppression of the occurrence of the image defect due to the transfer memory than the image forming apparatuses of the conventional example 1 and the comparison example.

TABLE 1

| | | | IDDTTM*3 (TV*4) | | | |
|---|---|---|---|---|---|---|
| | PE*1 | CB*2 | +1 KV | +1.5 KV | +2 KV | +3 KV |
| EMB. 1 | NO | YES | ○ | ○ | ○ | ○ |

TABLE 1-continued

| | IDDTTM*3 (TV*4) | | | | | |
|---|---|---|---|---|---|---|
| | PE*1 | CB*2 | +1 KV | +1.5 KV | +2 KV | +3 KV |
| CONV. EX. 1 | YES | NO | ○ | ○ | X | X |
| COMP. EX. 1 | NO | NO | ○ | X | X | X |

*1"PE" is the pre-exposure.
*2"CB" is the charging brush.
*3"IDDTTM" is the image defect due to the transfer memory.
*4"TV" is the transfer voltage.

Next, the mechanism for suppressing the image defect due to the transfer memory in the image forming apparatus 100 of this embodiment will be described.

Parts (a) to (d) of FIG. 5 are schematic views for illustrating progression of the surface potential of the photosensitive drum 1 in a position corresponding to a sheet interval in the case where images are continuously formed on recording materials P by the image forming apparatus 100 of this embodiment. Part (a) of FIG. 5 shows the surface potential of the photosensitive drum 1 before passing through the transfer position Pe, and similarly as in the case of part (a) of FIG. 3, exposure by the exposure device 4 is not performed in the position corresponding to the sheet interval, and therefore, the dark-portion potential Vd is maintained. Part (b) of FIG. 5 shows the surface potential of the photosensitive drum 1 after passing through the transfer position Pe, and similarly as in the case of part (b) of FIG. 3, a region having the surface potential lower in absolute value than the light-portion potential Vl or the surface potential inverted in polarity generates on the photosensitive drum 1 due to the transfer memory. Part (c) of FIG. 5 shows the surface potential of the photosensitive drum 1 after passing through the first charging position Pa (after passing through the first charging position Pa and before reaching the second charging position Pb). In the first charging position Pa, an electric charge is injected from each of the brush fibers of the charging brush 2 by injection charging into the surface of the photosensitive drum 1. In the injection charging, in a range in which the electric discharge does not generate, with a larger potential difference between the charging brush 2 and the photosensitive drum 1, a larger electric charge is injected from the charging brush 2 into the surface of the photosensitive drum 1. Consideration will be made by applying this principle to a single bristle (yarn) of the brush fibers of the charging brush 2 and a minute region of the surface of the photosensitive drum 1 to which the single bristle is contacted. That is, a potential of each of the brush fibers of the charging brush 2 is the same, but the potential fluctuates due to the transfer memory between minute regions of the surface of the photosensitive drum 1 to which each of the brush fibers is contacted. Further, in a minute region of the photosensitive drum 1 having the surface potential lower in absolute value than the light-portion potential Vl due to the transfer memory or in a minute region of the photosensitive drum 1 having the surface potential inverted in polarity, a larger electric charge flows from the charging brush 2 into the photosensitive drum 1. As a result, as shown in part (c) of FIG. 5, in the region having the surface potential lower in absolute value than the light-portion potential Vl or having the surface potential inverted in polarity, the electric charge flows from the charging brush 2 into the photosensitive drum 1 in a large amount, and the potential in the region preferentially increases, so that the surface potential of the photosensitive drum 1 is uniformized. Part (d) of FIG. 5 shows the surface potential of the photosensitive drum 1 after passing through the second charging position Pb (after passing through the second charging position Pb and before reaching the transfer position Pe). When a degree of unevenness of the surface potential of the photosensitive drum 1 is reduced to the state of part (c) of FIG. 5, and further, the surface potential of the photosensitive drum 1 can be recovered to the state of part (c) of FIG. 5, as shown in part (d) of FIG. 5, a substantially uniform dark-portion potential Vd can be formed on the photosensitive drum 1 by passing through the second charging position Pb.

Thus, according to this embodiment, a degree of the transfer memory such that the surface potential lower in absolute value than the light-portion potential Vl or the surface potential inverted in polarity generates is alleviated, so that it becomes possible to suppress the occurrence of the image defect due to the transfer memory.

(5) First Charging Ratio (Brush Charging Ratio)

In order to obtain a sufficient suppressing effect of the image defect due to the transfer memory, it is preferable that a ratio of a potential amount changed in the first charging position Pa to a potential amount changed in the first charging position Pa and the second charging position Pb is a predetermined value or more. This ratio of the potential amount changed in the first charging position Pa to the potential amount changed in the first charging position Pa and the second charging position Pb is referred to as a "first charging ratio R1". At this time, the first charging ratio R1 can be represented by the following formula (1).

$$R1[\%] = \{(V1 - Vt)/(Vd - Vt)\} \times 100 \tag{1}$$

Here, V1 is a surface potential of the photosensitive drum 1 after passing through the first charging position Pa and before reaching the second charging position Pb. Vt is the surface potential of the photosensitive drum 1 after passing through the transfer position Pe and before reaching the first charging position Pa. Vd is the dark portion potential (surface potential of the photosensitive drum 1 formed in the second charging position Pb).

For example, in the image forming apparatus 100 of this embodiment, in the case where the transfer voltage is +3000 V, an average (value) of a measurement result of each of the potentials in the position corresponding to the sheet interval was V1=−70 V, Vt=+40 V, and Vd=−500 V. In this case, by applying the averages of the respective potentials to the above-described formula (1), it is possible to calculate that the first charging ratio R1 approximately equals to 20% (R1≈20%). Incidentally, the average of the measurement result of each potential is represented by an average of the measurement result of a sufficient number of points (for example, 10 points to 30 points) with respect to the surface movement direction of the photosensitive drum 1.

A relationship between this first charging ratio R1 and the suppressing effect of the image defect due to the transfer memory was checked. By using the image forming apparatus 100 of this embodiment, the occurrence or non-occurrence of the image defect due to the transfer memory in the case where a first charging voltage applied to the charging brush 2 was changed was evaluated. The transfer voltage was fixed to +3000 V. Other conditions are the same as those in an experiment in which the result of the table 1 was obtained. Further, in the constitution of this embodiment, when the first charging voltage exceeds −500 V (when an absolute value of the first charging voltage of the negative polarity exceeds 500 V), the electric discharge generates between the charging brush 2 and the photosensitive drum 1, so that another defect such as charging non-uniformity occurs in some instances. For that reason, the first charging voltage was changed from 0 V to −500 V, at which a potential difference between the charging brush 2 and the photosensitive drum 1 in the first charging position Pa becomes less than a discharge start voltage. A result is shown in a table 2 appearing hereinafter.

From the table 2, it is understood that in order to suppress the occurrence of the image defect due to the transfer memory, the first charging ratio R1 may preferably be a predetermined value or more, and may preferably be R1=10% or more in the constitution of this embodiment.

Incidentally, in the constitution in which the injection charging is performed by applying the first charging voltage of less than the discharge start voltage to the first charging member, the potential amount of the photosensitive drum 1 capable of being changed by the first charging member has a limit to some extent, and typically, the first charging ratio R1 is 50% or less. Further, a second charging voltage at which a potential difference between the charging roller 3 and the photosensitive drum 1 in the second charging position Pb becomes the discharge start voltage or more is applied to the charging roller 3, so that the surface of the photosensitive drum 1 is charged to a predetermined dark-portion potential Vd.

TABLE 2

| AVTCB*[1][V] | IDDTTM*[2] | FCR*[3]R1[%] |
|---|---|---|
| 0 | x | 0 |
| −50 | x | 2 |
| −100 | x | 4 |
| −150 | x | 6 |
| −200 | x | 8 |
| −250 | ○ | 10 |
| −300 | ○ | 12 |
| −350 | ○ | 14 |
| −400 | ○ | 16 |
| −450 | ○ | 18 |
| −500 | ○ | 20 |

*[1]"AVTCB" is the applied voltage to the charging brush.
*[2]"IDDTTM" is the image defect due to the transfer memory at transfer voltage = 3000 V.
*[3]"FCR" is the first charging ratio.

FIG. 6 is a graph showing an example of a measurement result of progression of the surface potential Vt of the photosensitive drum 1 after passing through the transfer position Pe and before reaching the first charging position Pa in the same condition as the condition in an experiment in which the result of the table 2 was obtained. In the case where the first charging ratio R1 is acquired by the above-described formula (1), as Vt in the position corresponding to the sheet interval ("PAPER INTERVAL"), it is possible to use Vt obtained by calculating an average of a waveform of the surface potential of the photosensitive drum 1 in the position corresponding to the sheet interval. On the other hand, as shown in FIG. 6, in a situation such that the transfer memory occurs, a value of Vt in the position corresponding to the sheet interval fluctuates. This situation is a situation described using part (b) of FIG. 5, and in order to suppress the image defect due to the transfer memory, there is a need that a difference between a maximum (value) and a minimum (value) of Vt in the position corresponding to the sheet interval is made small in the first charging position Pa. An index R1' of the first charging ratio necessary to suppress the image defect due to the transfer memory can be obtained from the following formula (2).

$$R1'[\%] = \{(Vtmax - Vtmin)/(Vd - Vtave)\} \times 100 \quad (2)$$

Here, Vtmax is the maximum of Vt in the position corresponding to the sheet interval, Vtmin is the minimum of Vt in the position corresponding to the sheet interval, and Vtave is an average of Vt in the position corresponding to the sheet interval. In the case of FIG. 6, Vtmax=+71 V, Vtmin=+18 V, Vd=−500 V, and Vtave=+40 V, so that R1'=−9.8% can be calculated. This value roughly coincides with a threshold of the first charging ratio R1, for suppressing the image defect due to the transfer memory, acquired in the experiment in which the result of the table 2 was obtained. Thus, the first charging ratio may be set to not less than R1' calculated by the above-described formula (2). Incidentally, Vtmax and Vtmin in the above-described formula (2) are not limited to the maximum and the minimum. For example, with respect to a magnitude of a fluctuation in value of Vt in the position corresponding to the sheet interval, when a difference between the maximum and a value lower than the maximum by 1 and a difference between the minimum and a value higher than the minimum by 1 are sufficiently small, R1' may be calculated by using the value lower than the maximum by 1 (not limited to 1) and the value higher than the minimum by 1 (not limited to 1).

Further, in order to obtain a better transfer memory reducing effect, it is desirable that an average interyarn distance of the charging brush 2 is smaller than an average cell diameter of the surface of the elastic foam layer of the transfer roller 6. As described above, unevenness of the surface potential non-uniformity of the photosensitive drum 1 due to the transfer memory depends on the cell diameter of the surface of the transfer roller 6. In the case where the average interyarn distance of the charging brush 2 is larger than this unevenness of the surface potential non-uniformity depending on the cell diameter, a minute region in which the brush fibers of the charging brush 2 do not contact the photosensitive drum surface generates on the photosensitive drum 1, so that it becomes difficult to sufficiently alleviate the transfer memory in some instances. From such a viewpoint, the average interyarn distance of the charging brush 2 may more preferably be 70% or less, further preferably be 50% or less, of the average cell diameter of the surface of the elastic foam layer of the transfer roller 6. In this embodiment, in the case where the cell diameter is measured by the above-described measuring method, the cell diameter of the surface of the transfer roller 6 is 300 μm. Further, in this embodiment, a planting density of the charging brush 2 is 200 kF/inch$^2$, so that the average interyarn distance of the charging brush 2 can be acquired as 57 μm by the following calculation. Incidentally, the average interyarn distance may also be acquired by observation similarly as in the above-described case of the cell diameter of the foam member.

$$200\ \text{kF/inch}^2 = 200{,}000/645.16 \approx 310\ \text{F/mm}^2$$

$$\sqrt{(310\ \text{F/mm}^2)} \approx 17.6\ \text{F/mm}$$

-continued $$1/(17.6\ \text{F/mm}) \approx 57\ \mu\text{m/F}$$

Thus, in this embodiment, the average interyarn distance of the charging brush 2 is set to a value smaller than the cell diameter of the surface of the elastic foam layer of the transfer roller 6.

Incidentally, with respect to the rotational axis direction of the photosensitive drum 1, it is desirable that a relationship between the average interyarn distance of the charging brush 2 and the average cell diameter of the surface of the elastic foam layer of the transfer roller 6 becomes the above-described relationship. In this embodiment, with respect to the rotational axis direction of the photosensitive drum 1 and the surface movement direction of the photosensitive drum 1, the average interyarn distance of the charging brush 2 is set sufficiently smaller than the average cell diameter of the surface of the elastic foam layer of the transfer roller 6.

(6) Modified Embodiment

A modified embodiment of this embodiment will be described. FIG. 7 is a schematic sectional view of an image forming apparatus 102 of the modified embodiment of this embodiment. In the image forming apparatus 102 of FIG. 7, as the first charging member, instead of the charging brush 2 of the image forming apparatus 100 of FIG. 1, an injection roller 25 is provided in contact with the photosensitive drum 1 in a first charging position Pg. The injection roller 25 is rotated with rotation of the photosensitive drum 1. A surface of the rotating photosensitive drum 1 is electrically charged uniformly to a predetermined potential (dark-portion potential, charge potential) by the injection roller 25 and the charging roller 3. During charging, to the injection roller 25, a first charging voltage (first charging bias) which is a DC voltage of the negative polarity is applied from a first charging power source (high-voltage power source) 26. Except for the above-described point, a constitution and an operation of the image forming apparatus 102 of FIG. 7 are substantially the same as those of the image forming apparatus 100 of FIG. 1. In the image forming apparatus 102 of FIG. 7, to elements having functions or constitution identical or corresponding to those of the image forming apparatus 100 of FIG. 1, the same reference numerals or symbols as those of the image forming apparatus 100 of FIG. 1 are added.

The injection roller 25 is, similarly as in the case of the transfer roller 6, a roller prepared by forming a foam elastic layer on a core metal. That is, the injection roller 25 is constituted by an electroconductive base shaft (core metal, core portion) also functioning as an energy supplying electrode and an elastic foam layer cylindrically enclosing an outer peripheral surface thereof. To the injection roller 25, a first charging voltage of −500 V is applied, so that the injection roller 25 charges the photosensitive drum 1 principally by the injection charging. Similarly as in the case of the charging brush 2, in order to obtain a good transfer memory alleviating effect, an average cell diameter of the surface of the elastic foam layer of the injection roller 25 may desirably be smaller than an average cell diameter of the surface of the elastic foam layer of the transfer roller 6. Further, the average cell diameter of the surface of the elastic foam layer of the injection roller 25 may more preferably be 70% or less, further preferably be 50% or less, of the average cell diameter of the surface of the elastic foam layer of the transfer roller 6. In this modified embodiment, in the case where the average cell diameter is measured by the above-described method, the cell diameter of the surface of the injection roller 25 is 150 μm, and the cell diameter of the surface of the transfer roller 6 is 300 μm. Thus, in this modified embodiment, the average cell diameter of the surface of the elastic foam layer of the injection roller 25 is set smaller than the average cell diameter of the surface of the elastic foam layer of the transfer roller 6.

By using the image forming apparatus 102 of this modified embodiment, an experiment for evaluating the occurrence or non-occurrence of the image defect due to the transfer memory, which is the same as the experiment in which the result of the table 1 was obtained was conducted. As a result, also in the image forming apparatus 102 of this modified embodiment, similarly as the image forming apparatus 100 of this embodiment, it turned out that a suppressing effect of the occurrence of the image defect due to the transfer memory is obtained.

Thus, also in a constitution in which the injection charging is performed by using the charging member having a foam structure, such as the injection roller 25 as a first charging member, it is possible to suppress the occurrence of the image defect due to the transfer memory.

(7) Effect

Thus, in this embodiment, the image forming apparatus 100 includes the rotatable photosensitive member (photosensitive drum) 1; the first charging member (charging brush) 2 for electrically charging a surface of the photosensitive member 1 in contact with the surface of the photosensitive member 1 in the first charging position Pa with respect to a rotational direction of the photosensitive member 1; the second charging member (charging roller) 3 for electrically charging the surface of the photosensitive member 1 in the second charging position Pb with respect to the rotational direction of the photosensitive member 1; the developing member (developing roller) 5*a* for forming a toner image on the surface of the photosensitive member 1 by supplying toner, charged to a predetermined polarity, to the surface of the photosensitive member in a developing position with respect to the rotational direction of the photosensitive member; the transfer member (transfer roller) 6 contacting the surface of the photosensitive member 1 in the transfer position Pe with respect to the rotational direction of the photosensitive member 1 and for transfer the toner image from the photosensitive member 1 onto a recording material passing through between the photosensitive member 1 and the transfer member 6; a first charging voltage applying portion (first charging power source) 20 for applying a first charging voltage of the predetermined polarity to the first charging member 1; the second charging voltage applying portion (second charging power source) 21 for applying a second charging voltage of the predetermined polarity to the second charging member 3; the transfer voltage applying portion (transfer power source) 18 for applying a transfer voltage, of an opposite polarity to the predetermined polarity, to the transfer member 6; and the controller 40 for controlling the first charging voltage applying portion 20, the second charging voltage applying portion 21, and the transfer voltage applying portion 18.

With respect to the rotational direction of the photosensitive member 1, the first charging position Pa is positioned downstream of the transfer position Pe and upstream of the second charging position Pb, the second charging position Pb is positioned downstream of the first charging position Pa and upstream of the developing position Pd, the developing position is positioned downstream of the second charging position Pb and upstream of the transfer position Pe, and the transfer position Pe is positioned downstream of the developing position Pd and upstream of the first charging position Pa. The controller 40 controls the transfer voltage applying portion 18 so that at least a part of a region of the surface of the photosensitive member 1 directly contacting the transfer member 6 in the transfer position Pe has a potential of the opposite polarity to the predetermined polarity, the first charging voltage applying portion 20 so that the surface of the photosensitive member 1 is charged in the first charging position Pa by applying the first charging voltage of less than a discharge start voltage to the first charging member 2 in the first charging position Pa, and the second charging voltage applying portion 21 so that the surface of the photosensitive member 1 is charged in the second charging position Pb by applying the second charging voltage of not less than the discharge start voltage to the second charging member 3 in the second charging position Pb.

Here, with respect to the above-described at least a part of the region, of the surface potential of the photosensitive drum 1 changed in the first charging position Pa and the second charging position Pb, when the ratio of the surface potential of the photosensitive member 1 changed in the first charging position Pa is the first charging ratio, the controller 40 may preferably control the first charging voltage applying portion 20 so that the first charging ratio becomes 10% or more. In other words, with respect to the above-described at least part of the region, when the ratio of the surface potential of the photosensitive member 1 changed in the first charging position Pa to the surface potential of the photosensitive member 1 changed in the first charging position Pa and the second charging position Pb is a first charging ratio, a surface potential of the photosensitive member 1 after passing through the transfer position Pe and before reaching the first charging position Pa is Vt, a surface potential of the photosensitive member 1 formed in the second charging position Pb is Vd, a maximum of Vt is Vtmax, a minimum of Vt is Vtmin, and an average of Vt is Vtave, the controller 40 may preferably control the first charging voltage applying portion 20 so that the first charging ratio is not less than R1' represented by the following formula: $R1'[\%]=\{(Vtmax-Vtmin)/(Vd-Vtave)\}\times 100$.

Particularly, in this embodiment, the above-described at least a part of the region is a region corresponding to between the recording material P and the subsequent recording material P which is the recording material P subsequent to the recording material P in the transfer position Pe.

Further, in this embodiment, the controller 40 controls the transfer voltage applying portion 18 so that the same transfer voltage is applied to the transfer member 6 when the region of the surface of the photosensitive member 1 corresponding to between the recording material P and the subsequent recording material P is in the transfer position Pe and when a region of the surface of the photosensitive member 1 corresponding to the recording material is in the transfer position Pe. Further, in this embodiment, the transfer member 6 is constituted by including a foam member contactable to the surface of the photosensitive member 1. Further, in this embodiment, the first charging member 2 is constituted by including a brush contactable to the surface of the photosensitive member 1. In this case, an average interyarn distance of the brush of the first charging member 2 may preferably be smaller than an average cell diameter of the foam member of the transfer member 6.

Further, the first charging member 2 may be constituted by including a foam member contactable to the surface of the photosensitive member 1. In this case, an average cell diameter of the foam member of the first charging member 2 may preferably be smaller than an average cell diameter of the foam member of the transfer member 6. Further, in this embodiment, toner remaining on the surface of the photosensitive member 1 after the toner image is transferred from the photosensitive member 1 onto the recording material P is collected by the developing member 5*a*.

Further, according to this embodiment, in a constitution in which a transfer memory such that the surface of the photosensitive member directly contacting the transfer member in the transfer portion has an opposite polarity to the charge polarity of the photosensitive member occurs, it is possible to suppress the occurrence of the image defect due to the transfer memory.

Next, another embodiment (embodiment 2) of the present invention will be described. Basic constitution and operation of an image forming apparatus of this embodiment are the same as those of the image forming apparatus in the embodiment 1. Accordingly, in the image forming apparatus of this embodiment, elements having the same or corresponding functions or constitutions to those of the image forming apparatus in the embodiment 1 will be omitted from detailed description by adding the same reference numerals or symbols as those in the embodiment 1.

When a durability test for the purpose of further life-time extension in the image forming apparatus 100 of the embodiment 1 is advanced, the charging brush 2 is contaminated, so that the first charging ratio R1 represented by the above-described formula (1) lowers in some cases. On the other hand, it would be considered that depending on a cumulative use amount of the charging brush 2, an absolute value of the first charging voltage applied to the charging brush 2 is made large. However, when a potential difference of a predetermined value or more generates between the charging brush 2 and the photosensitive drum 1, the electric discharge generates, and therefore, there is a limit in that the absolute value of the first charging voltage is made large. This embodiment aims at more satisfactorily maintaining the suppressing effect of the image defect due to the transfer memory by suppressing the lowering in first charging ratio R1 with an increase in cumulative use amount of the charging brush 2.

FIG. 8 is a schematic sectional view of an image forming apparatus 103 of this embodiment. In this embodiment, the image forming apparatus 103 includes a cleaning device 31 as a cleaning means for removing a deposited matter, such as the transfer residual toner or paper powder, remaining on the photosensitive drum 1 after passing through the transfer position Pe, from the surface of the photosensitive drum 1. The cleaning device 31 includes a cleaning blade 31*a* as a cleaning member provided so as to contact the surface of the photosensitive drum 1. With respect to the rotational direction of the photosensitive drum 1, a position where removal of the deposited matter on the photosensitive drum 1 by the cleaning blade 31*a* is performed (position where the photosensitive drum surface contacts the cleaning blade 31*a* in this embodiment) is a cleaning position Ph. A charging brush 2 similar to the charging brush 2 in the embodiment 1 is provided so as to contact the photosensitive drum 1 in a first charging position Pi on the photosensitive drum 1 after passing through the cleaning position Ph (and before reaching the second charging position Pb). Except for the above-described point, a constitution and an operation of the image forming apparatus 103 of this embodiment are substantially the same as those of the image forming apparatus 100 of the embodiment 1. Thus, in this embodiment, the image forming apparatus 103 includes the cleaning member 31*a* for removing the toner from the surface of the photosensitive drum 1 on a side downstream of the transfer position Pe and upstream of the first charging position Pi with respect to the rotational direction of the photosensitive member 1.

The image forming apparatus 100 of the embodiment 1 had the cleaner-less constitution in which the transfer residual toner was collected and re-utilized by the developing device 5. On the other hand, in the image forming apparatus 103 of this embodiment, the cleaning device 31 having a blade collection constitution such that the surface of the photosensitive drum 1 before reaching the charging brush 2 is cleaned is disposed. For that reason, in the image forming apparatus 103 of this embodiment, it is possible to suppress that the charging brush 2 is contaminated with the deposited matter, such as the transfer residual toner or the paper powder, with the increase in cumulative use amount of the charging brush 2. As a result, in the image forming apparatus 103 of this embodiment, the lowering in first charging ratio R with the increase in cumulative use amount of the charging brush 2 is suppressed, so that the suppressing effect of the image defect due to the transfer memory can be more satisfactorily maintained.

Next, another embodiment (embodiment 3) of the present invention will be described. Basic constitution and operation of an image forming apparatus of this embodiment are the same as those of the image forming apparatus in the embodiment 1. Accordingly, in the image forming apparatus of this embodiment, elements having the same or corresponding functions or constitutions to those of the image forming apparatus in the embodiment 1 will be omitted from detailed description by adding the same reference numerals or symbols as those in the embodiment 1.

When an evaluation experiment is conducted in a low-temperature/low-humidity environment (for example, 15° C./10% RH) in the image forming apparatus 100 of the embodiment 1, due to an increase in electric resistance of the charging brush 2 and the photosensitive drum 1 itself and due to an increase in contact resistance between the charging brush 2 and the photosensitive drum 1, the first charging ratio R1 represented by the above-described formula (1) lowers in some cases. As described in the embodiment 2, when a potential difference of a predetermined value or more generates between the charging brush 2 and the photosensitive drum 1, the electric discharge generates, and therefore, there is a limit in that the absolute value of the first charging voltage is made large. This embodiment aims at obtaining the suppressing effect of the image defect due to the transfer memory irrespective of the environment by suppressing the lowering in first charging ratio R1 with the low-temperature/low-humidity environment.

In this embodiment, instead of the photosensitive drum 1 in the image forming apparatus 100 of the embodiment 1, a photosensitive drum 61 shown in parts (a) and (b) of FIG. 9 is used. Except for this point, a constitution and an operation of the image forming apparatus of this embodiment are substantially the same as those of the image forming apparatus 100 of the embodiment 1. Part (a) of FIG. 9 is a schematic sectional view of the photosensitive drum 61 in this embodiment, part (b) of FIG. 9 is a schematic sectional view showing a layer structure of the photosensitive drum 61 in this embodiment.

The photosensitive drum 61 in this embodiment will be described. The photosensitive drum 61 in this embodiment has an electric charge injection function at an outermost surface. As shown in part (b) of FIG. 9, the photosensitive drum 61 includes an electroconductive supporting member 61*a*, an electroconductive layer 61*b*, an undercoat layer 61*c*, a photosensitive layer consisting of two layers of a charge generating layer 61*d* and a charge transporting layer 61*e*, and a charge injection layer 61*f*. The charge injection layer 61*f* forming the surface of the photosensitive drum 61 contains electroconductive particles 61*g*. The charge injection layer 61*f* is formed by dispersing the electroconductive particles 61*g* in a binder resin. A content of the electroconductive particles 61*g* is 5.0 vol. % or more and 70.0 vol. % or less per an entire volume of the charge injection layer 61*f*. Further, volume resistivity of the charge injection layer 61*f* is $1.0\times10^{9}$ Ω·cm or more and $1.0\times10^{14}$ Ω·cm or less.

When the volume resistivity of the charge injection layer 61*f* is less than $1.0\times10^{9}$ Ω·cm, an electric resistance of the charge injection layer 61*f* is excessively low, and the electrostatic latent image cannot be appropriately formed, so that it becomes difficult to develop the electrostatic latent image into a predetermined image. On the other hand, when the volume resistivity of the charge injection layer 61*f* exceeds $1.0\times10^{14}$ Ω·cm, the electric resistance of the charge injection layer 61*f* is excessively high, and a charge injection property of the electric charge from the charging brush 2 into the charge injection layer 61*f* lowers, and therefore, it becomes difficult to obtain, as an object of this embodiment, the first charging ratio R1 of not less than a predetermined value in the low-temperature/low-humidity environment. In order to satisfy the above-described range of the volume resistivity, the content of the electroconductive particles 61*g* may desirably be 5.0 vol. % or more and 70.0 vol. % or less per the entire volume of the charge injection layer 61*f*. When the content of the electroconductive particles 61*g* exceeds 70.0 vol. %, the charge injection layer 61*f* itself becomes brittle, and therefore, the surface of the photosensitive drum 61 is liable to be abraded through a long-term use. By this, charging uniformity of the photosensitive drum 61 lowers, and improper charging is liable to occur when speed-up of the image forming apparatus 100 is realized, so that an image defect (image trouble) is liable to occur.

The volume resistivity of the charge injection layer 61*f* can be controlled by, for example, a particle size of the electroconductive particles 61*g*, other than the content of the electroconductive particles 61*g*. The particle size of the electroconductive particles 61*g* may preferably be 5 nm or more and 300 nm or less, more preferably be 40 nm or more and 250 nm or less in terms of a number-average particle size. When the number-average particle size of the electroconductive particles 61*g* is less than 5 nm, a specific surface area of the electroconductive particles 61*g* becomes large, and a degree of water absorption in the neighborhood of the electroconductive particles 61*g* on the surface of the charge injection layer 61*f* becomes large, so that the volume-resistivity of the charge injection layer 61*f* is liable to lower. When the number-average particle size of the electroconductive particles 61*g* exceeds 300 nm, not only a degree of dispersion of particle in the charge injection layer 61*f* becomes worse, but also an area of an interface with the binder resin lowers, so that a resistance in the interface increases and thus the charge injection property is liable to become worse.

As the electroconductive particles 61*g* contained in the charge injection layer 61*f*, it is possible to cite particles of metal oxides such as titanium oxide, zinc oxide, tin oxide, indium oxide, and the like. In the case where the metal oxide is used as the electroconductive particles 61*g*, the metal oxide may be doped with an element, such as niobium, phosphorus or aluminum, or an oxide thereof. Further, the electroconductive particles 61*g* may have a lamination structure including core material particles and a coating layer coating the particles. As the core material particles, it is possible to cite particles of titanium oxide, barium sulfate, zinc oxide, and the like. As the coating layer, it is possible to cite layers of titanium oxide, tin oxide, and the like, and in this embodiment, the layer of titanium oxide is preferred from a viewpoint of the charge injection property from the charging brush 2.

Further, when the titanium oxide contains the niobium, the charge injection property becomes better, so that the charge injection property can be improved in a small amount. A content of the niobium may preferably be 0.5 wt. % or more and 15.0 wt. % or less, more preferably be 2.6 wt. % or more and 10.0 wt. % or less, per an entire weight of the niobium-containing titanium oxide particles.

The titanium oxide particles containing the niobium may preferably be titanium oxide particles of an anatase type or a rutile type, and may more preferably be the titanium oxide particles of the anatase type. By using the titanium oxide of the anatase type, charge transfer in the charge injection layer 61*f* becomes smooth, and therefore, the charge injection becomes better. It is more preferable that the titanium oxide particles are particles including the anatase type titanium oxide particles as a core material and a coating layer of titanium oxide containing niobium at a surface of the core material. The anatase type titanium oxide particles are used as the core material, and are coated with the niobium-containing titanium oxide at the surface thereof, so that the electric charge becomes easy to move in the charge injection layer 61*f*, and in addition, the charge injection property from the charging brush 2 into the charge injection layer 61*f* can be enhanced. Further, it is possible to suppress a lowering in volume resistivity of the charge injection layer 61*f*.

Thus, in the image forming apparatus 100 of this embodiment, by using the photosensitive drum 61 including the charge injection layer 61*f* as the surface layer, even in a low-temperature/low-humidity environment, good charge injection can be performed between the charging brush 2 and the photosensitive drum 1. As a result, in the image forming apparatus 100 of this embodiment, it becomes possible to suppress the lowering in first charging ratio R1 in the low-temperature/low-humidity environment, so that it becomes possible to obtain the suppressing effect of the occurrence of the image defect due to the transfer memory irrespective of the environment.

In the above, the present invention was described based on specific embodiments, but the present invention is not limited to the above-described embodiments.

In the above-described embodiments, the case where the transfer voltage is the same between during the sheet passing and in the sheet interval was described, but the present invention is not limited to such a constitution. For example, even in the case where an absolute value of the transfer voltage is made smaller in the sheet interval than during the sheet passing, when the surface potential of the photosensitive member in the position corresponding to the sheet interval is inverted in polarity to the opposite polarity to the normal charge polarity, the occurrence of the image defect due to the transfer memory can be suppressed by the present invention.

Further, for example, in the case where in at least a part of the pre-rotation step and the post-rotation step, the surface potential of the photosensitive member is inverted in polarity to the opposite polarity to the normal charge polarity, it is possible to suppress the occurrence of the image defect due to the transfer memory.

Further, in the case where the image is formed on a recording material that is smaller in width in the rotational axis direction of the photosensitive member (widthwise direction substantially perpendicular to a recording material conveying direction) than a maximum image formable width in the image forming apparatus, a region of the photosensitive member directly contacting the transfer member in the transfer position can generate. In this region, the surface potential of the photosensitive member is inverted in polarity to the opposite polarity to the normal charge polarity similarly as the region corresponding to the sheet interval described in the embodiments above in some instances. Further, in the case where images are continuously formed on sheets of large-size paper after sheets of small-size paper or in the like case, there is a possibility of the occurrence of the image defect due to the transfer memory in this region. According to the present invention, also, the transfer memory in this region can be alleviated similarly as in the region corresponding to the sheet interval described in the embodiments above, so that the occurrence of the image defect due to the transfer memory in this region can be suppressed.

Further, also, in a region of the photosensitive member in which the recording material is interposed between the photosensitive member and the transfer member during the sheet passing, the surface potential of the photosensitive member is capable of becoming a surface potential smaller in absolute value than the light-portion potential although the surface potential is not inverted in polarity to the opposite polarity to the normal charge polarity (see FIG. 6). According to the present invention, the surface potential in this region can also be uniformized in the first charging position, and therefore, it is advantageous in that the dark-portion potential is formed more uniformly in the second charging position.

Further, the photosensitive member is not limited to a drum-shaped member, but may also be a belt-shaped member or the like member.

Further, the transfer member is not limited to the roller-shaped member, but may also be a brush-shaped member, a sheet-shaped member, or the like member. In the case where the transfer member is the brush-shaped member, an average interyarn distance of the charging brush may preferably be made smaller than (more preferably be made not more than 70% of, further preferably be made not more than 50% of) an average interyarn distance of the transfer brush.

Further, in the above-described embodiments, the charging brush as the first charging member was the brush member which was fixedly disposed, but for example, the charging brush may also be a brush roller constituted by including a core portion and a brush portion provided around the core portion.

Further, the image forming apparatus is not limited to the monochromatic image forming apparatus, but for example, the image forming apparatus may also be a color image forming apparatus including a plurality of image forming portions each including a photosensitive member and a process means actable on the photosensitive member. In this case, the present invention is applicable to at least one of the plurality of photosensitive members.

Further, in the above-described embodiments, the case where the image forming apparatus does not include the pre-exposure device was described. According to the present invention, even when the pre-exposure device is not provided, the transfer memory is alleviated, so that the occurrence of the image defect due to the transfer memory can be suppressed. However, the present invention is not limited thereto, but even in the case where the pre-exposure device is provided in the image forming apparatus, it is effective to alleviate the transfer memory by uniformizing the surface potential of the photosensitive member inverted in polarity to the opposite polarity to the normal charge polarity.

Further, in the above-described embodiments, each of the normal charge polarity of the photosensitive member and the normal charge polarity of the toner was the negative polarity, but may also be the positive polarity, and in that case, a person skilled in the art can appropriately change the polarity in such a manner that the polarity of each of various applied voltages is changed to the opposite polarity to the associated polarity in the above-described embodiments, or in the like manner.

Further, dimensions, materials, shapes, relative arrangement, and the like of constituent parts described in the embodiments above should be appropriately changed depending on constitutions and various conditions of apparatuses or devices to which the present invention is applied.

That is, the present invention is not intended to limit the scope of the present invention to the above-described embodiments.

According to the present invention, it is possible to suppress the occurrence of the image defect due to the transfer memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-199524 filed on Nov. 26, 2023, which is hereby incorporated by reference herein in its entirety.

What is claimed is:

1. An image forming apparatus comprising:

a rotatable photosensitive member;

a first charging member configured to electrically charge a surface of the photosensitive member in contact with the surface of the photosensitive member in a first charging position with respect to a rotational direction of the photosensitive member;

a second charging member configured to electrically charge the surface of the photosensitive member in a second charging position with respect to the rotational direction of the photosensitive member;

a developing member configured to form a toner image on the surface of the photosensitive member by supplying toner, charged to a predetermined polarity, to the surface of the photosensitive member in a developing position with respect to the rotational direction of the photosensitive member;

a transfer member contacting the surface of the photosensitive member in a transfer position with respect to the rotational direction of the photosensitive member and configured to transfer the toner image from the photosensitive member onto a recording material passing through between the photosensitive member and the transfer member;

a first charging voltage applying portion configured to apply a first charging voltage of the predetermined polarity to the first charging member;

a second charging voltage applying portion configured to apply a second charging voltage of the predetermined polarity to the second charging member;

a transfer voltage applying portion configured to apply a transfer voltage, of an opposite polarity to the predetermined polarity, to the transfer member; and a controller configured to control the first charging voltage applying portion, the second charging voltage applying portion, and the transfer voltage applying portion, wherein with respect to the rotational direction of the photosensitive member, the first charging position is positioned downstream of the transfer position and upstream of the second charging position, the second charging position is positioned downstream of the first charging position and upstream of the developing position, the developing position is positioned downstream of the second charging position and upstream of the transfer position, and the transfer position is positioned downstream of the developing position and upstream of the first charging position, and wherein the controller controls:

the transfer voltage applying portion so that on the surface of the photosensitive member directly contacting the transfer member in the transfer position, a region corresponding to between the recording material and a subsequent recording material, which is a recording material subsequent to the recording material, has a potential of the opposite polarity to the predetermined polarity, the first charging voltage applying portion so that the surface of the photosensitive member is charged in the first charging position by applying the first charging voltage of less than a discharge start voltage to the first charging member in the first charging position, the second charging voltage applying portion so that the surface of the photosensitive member is charged in the second charging position by applying the second charging voltage of not less than the discharge start voltage to the second charging member in the second charging position, and the first charging voltage applying portion so that a first charging ratio is 10% or more, wherein with respect to the region corresponding to between the recording material and the subsequent recording material, when a ratio of a surface potential of the photosensitive member changed in the first charging position to a surface potential of the photosensitive member changed in the first charging position and the second charging position is the first charging ratio.

2. The image forming apparatus according to claim 1, wherein with respect to the region corresponding to between the recording material and the subsequent recording material, when a ratio of a surface potential of the photosensitive member changed in the first charging position to a surface potential of the photosensitive member changed in the first charging position and the second charging position is a first charging ratio, a surface potential of the photosensitive member after passing through the transfer position and before reaching the first charging position is Vt, a surface potential of the photosensitive member formed in the second charging position is Vd, a maximum of Vt is Vtmax, a minimum of Vt is Vtmin, and an average of Vt is Vtave, the controller controls the first charging voltage applying portion so that the first charging ratio is not less than R1' represented by the following formula:

$$R1'[\%] = \{(Vtmax - Vtmin)/(Vd - Vtave)\} \times 100.$$

3. The image forming apparatus according to claim 1, wherein the controller controls the transfer voltage applying portion so that the same transfer voltage is applied to the transfer member when the region of the surface of the photosensitive member corresponding to between the recording material and the subsequent recording material is in the transfer position and when a region of the surface of the photosensitive member corresponding to the recording material is in the transfer position.

4. The image forming apparatus according to claim 1, wherein the transfer member is constituted by including a foam member contactable to the surface of the photosensitive member.

5. The image forming apparatus according to claim 4, wherein the first charging member is constituted by including a brush contactable to the surface of the photosensitive member.

6. The image forming apparatus according to claim 5, wherein an average interyarn distance of the brush of the first charging member is shorter than an average cell diameter of the foam member of the transfer member.

7. The image forming apparatus according to claim 4, wherein the first charging member is constituted by including a foam member contactable to the surface of the photosensitive member.

8. The image forming apparatus according to claim 7, wherein an average cell diameter of the foam member of the first charging member is shorter than an average cell diameter of the foam member of the transfer member.

9. The image forming apparatus according to claim 1, wherein toner remaining on the surface of the photosensitive member after the toner image is transferred from the photosensitive member onto the recording material is collected by the developing member.

10. The image forming apparatus according to claim 1, further comprising a cleaning member configured to remove toner from the surface of the photosensitive member in a position downstream of the transfer position and upstream of the first charging position with respect to the rotational direction of the photosensitive member.

11. The image forming apparatus according to claim 1, wherein the photosensitive member includes a charge injection layer forming the surface thereof.

12. The image forming apparatus according to claim 11, wherein the charge injection layer is constituted by dispersing electroconductive particles in a binder resin.

* * * * *